United States Patent
Tan et al.

(10) Patent No.: US 7,055,160 B1
(45) Date of Patent: May 30, 2006

(54) BEZEL DOOR FOR COMPUTER ENCLOSURE

(75) Inventors: Tang Yew Tan, San Francisco, CA (US); John Benjamin Filson, Los Altos, CA (US)

(73) Assignee: Apple Computer, Inc., Cupertino, CA (US)

( * ) Notice: Subject to any disclaimer, the term of this patent is extended or adjusted under 35 U.S.C. 154(b) by 170 days.

(21) Appl. No.: 10/327,717

(22) Filed: Dec. 20, 2002

(51) Int. Cl.
*G11B 33/02* (2006.01)
*E05F 11/38* (2006.01)

(52) U.S. Cl. .......................... 720/647; 49/323; 49/386

(58) Field of Classification Search ............... 720/647, 720/646, 655; 49/323, 381, 386, 501, 70; 312/223.2, 324, 326, 327, 328, 291, 292, 312/319.1, 319.2
See application file for complete search history.

(56) References Cited

U.S. PATENT DOCUMENTS

| | | | |
|---|---|---|---|
| 4,440,600 A * | 4/1984 | Cantavespre | 202/248 |
| 6,233,215 B1 * | 5/2001 | Paul et al. | 720/647 |
| D486,486 S | 2/2004 | Jobs et al. | |
| D487,893 S | 3/2004 | Jobs et al. | |
| D489,370 S | 5/2004 | Jobs et al. | |
| D494,971 S | 8/2004 | Jobs et al. | |
| D495,332 S | 8/2004 | Jobs et al. | |
| D496,040 S | 9/2004 | Jobs et al. | |
| 6,834,919 B1 * | 12/2004 | Mariano | 312/223.2 |
| 2004/0053698 A1 * | 3/2004 | Tastad et al. | 463/46 |

OTHER PUBLICATIONS

"Apple Unveils the New iMac", www.apple.com/pr.library/2002/jan/07imac.html, downloaded Aug. 21, 2002.

* cited by examiner

*Primary Examiner*—William J Klimowicz
(74) *Attorney, Agent, or Firm*—Beyer Weaver & Thomas, LLP

(57) ABSTRACT

A computer is disclosed. The computer includes a housing having an opening. The computer also includes a door that is movably coupled to the housing via a linkage mechanism. The linkage mechanism allows the door to move between a closed position where the door is placed against the housing and in front of the opening to prevent access therethrough, and an opened position where the door is placed away from the opening to allow access therethrough. The computer further includes a gimbal mechanism that allows the door to move relative to the linkage mechanism while constraining the door to the linkage mechanism. The gimbal mechanism provides a tight fit between the door and the housing when the door is in the closed position.

25 Claims, 15 Drawing Sheets

FIG. 1 -- PRIOR ART --

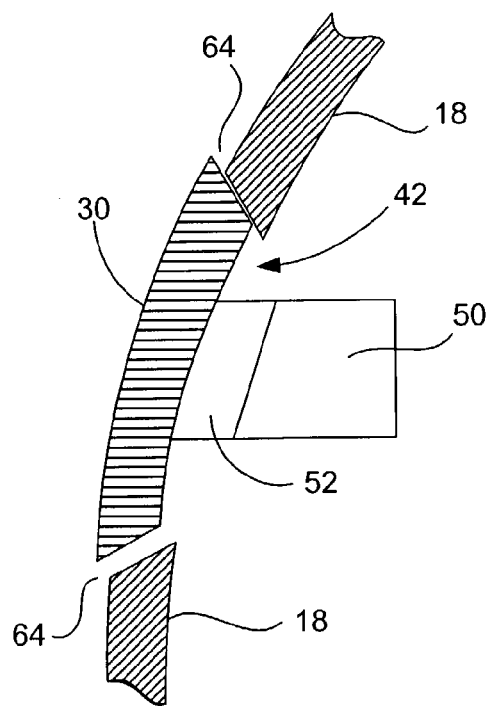
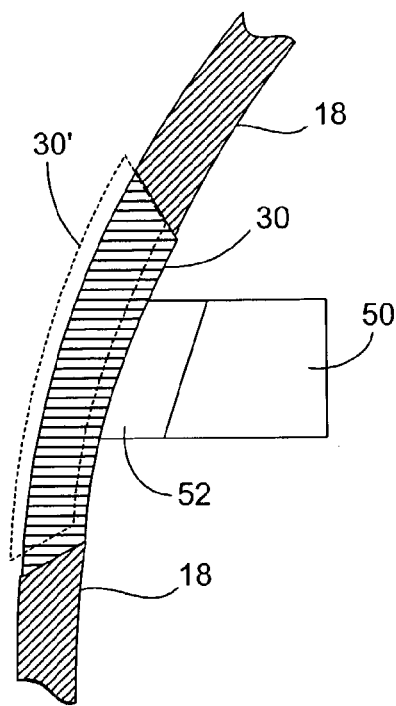
FIG. 6A    FIG. 6B
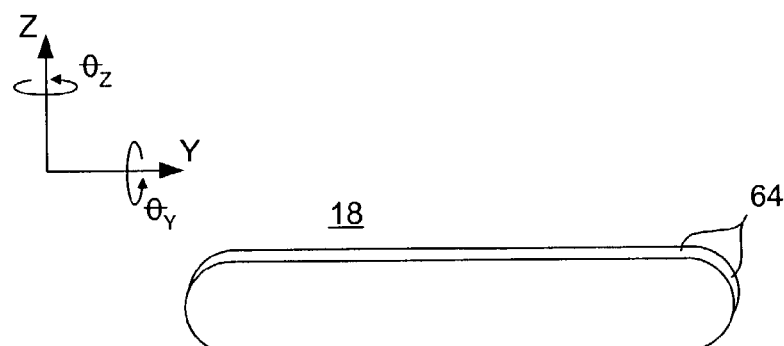
FIG. 7A
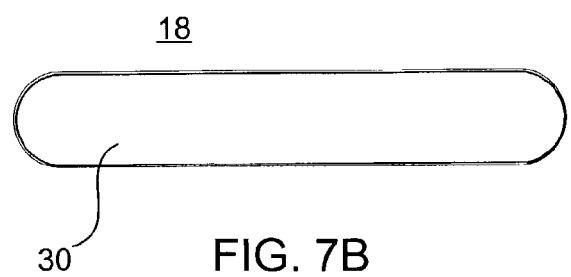
FIG. 7B

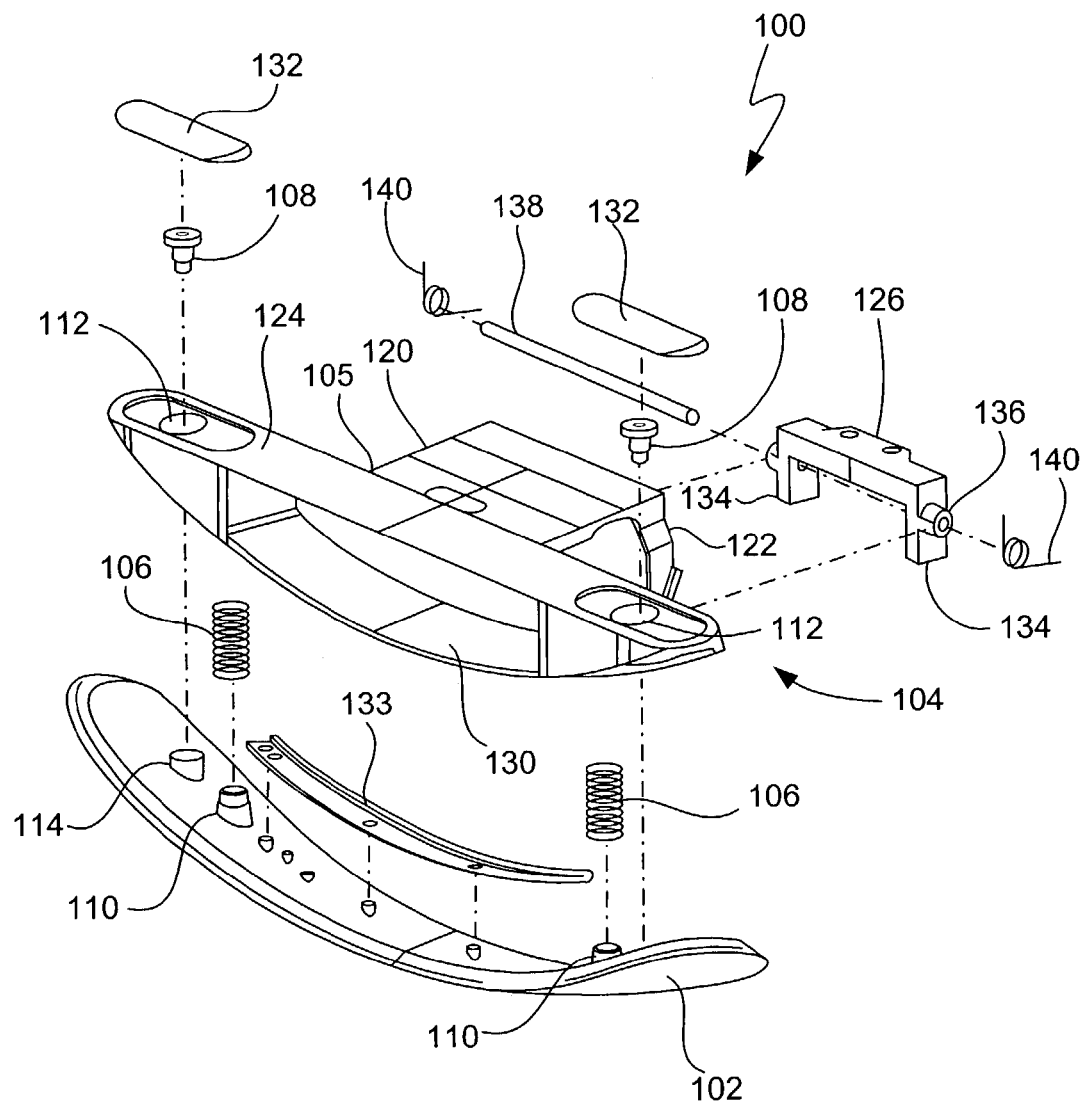
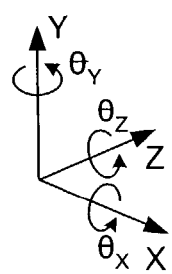
FIG. 10A

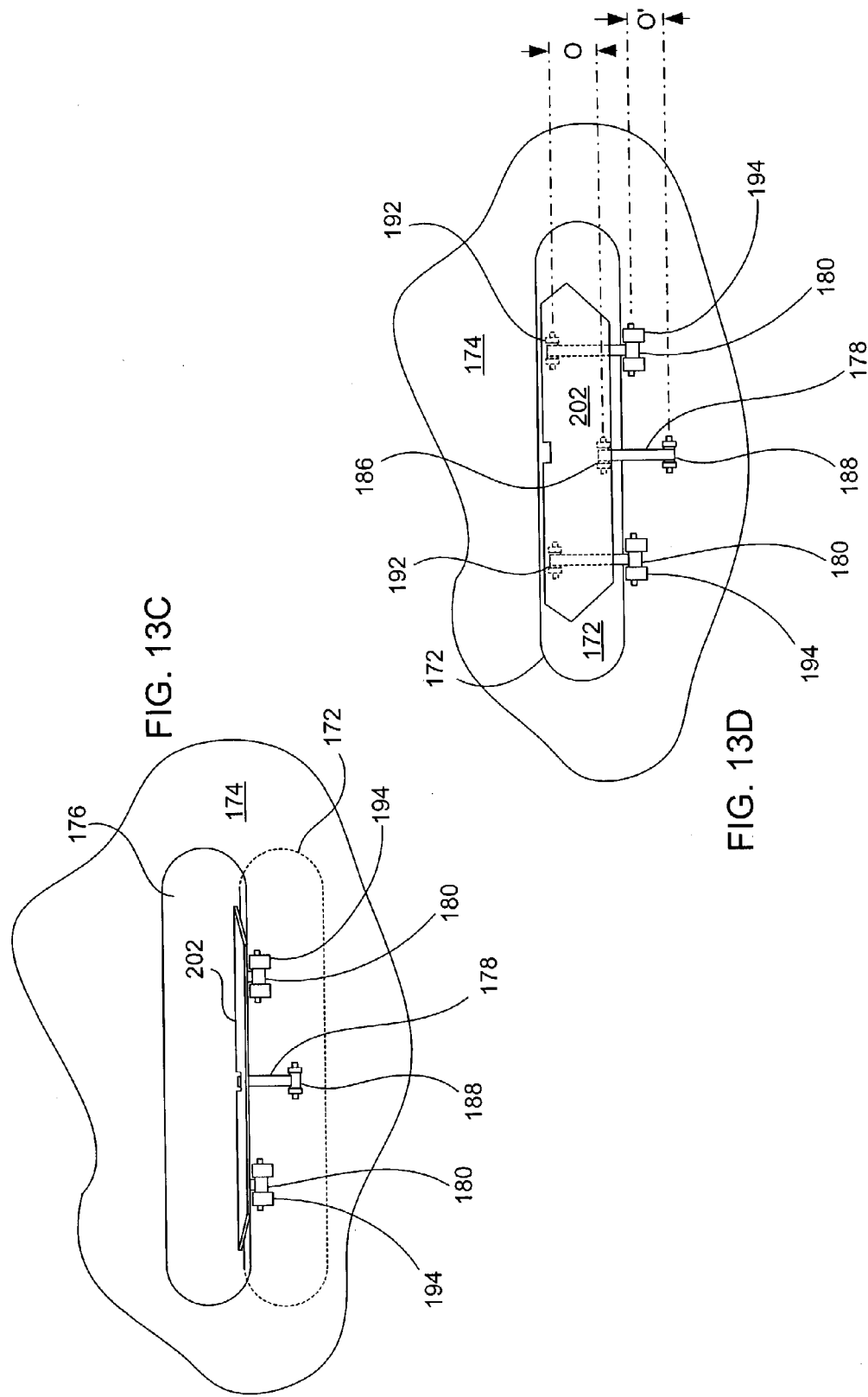

BEZEL DOOR FOR COMPUTER ENCLOSURE

BACKGROUND OF THE INVENTION

1. Field of Invention

The present invention relates generally to enclosures for computing devices. More particularly, the present invention relates to door mechanisms that allow a door to open and close relative to the enclosures.

2. Description of the Related Art

Computer systems such as general purpose computers typically include housings for enclosing various components and circuitry associated with operating the general purpose computers. The housings generally serve to shield and protect the components and circuitry from adverse conditions such as impact and dust. The housings also generally serve to define the shape or form of the general purpose computers. In most cases, the housings take the form of a box, as for example, the housings associated with tower style computers. This however can be discouraging to users who desire housings that are more unique and take up less space.

The housings themselves typically include openings that provide access to the internal components enclosed therein. For example, the openings may provide access to disk drives, memory boards, connectors, ports, etc. The housings may also include doors for preventing or allowing access through the openings. The doors are generally movable between an open and closed position. When closed, the doors cover the openings in order to protect the internal components. When opened, the doors are placed away from the openings in order to allow access therethrough.

With regards to optical disk drives (CD, DVD, etc.), the door is typically attached to a sliding tray that holds a disk and that moves in and out of the housing through the opening. When the tray is located outside of the housing, the disk may be inserted or removed from the tray. When the tray is located inside the housing, the disk may be processed by the general purpose computer, i.e., data may be retrieved or stored to and from the disk. The door generally abuts the housing when in the closed position. Unfortunately, however, substantial cracks may exist between the mating surfaces of the door and the housing because of stacking tolerances, i.e., the door may be misaligned with the opening during manufacture of the general purpose computer. The cracks may expose the internal components to unwanted materials, e.g., dust particles, or moisture. The cracks may also be unpleasing to the eye (e.g., makes the housing look cheap).

The door may also be rotationally coupled to the housing via hinges. When using hinges, the sliding tray of the optical disk drive generally pushes on the inner portion of the door in order to open the door and allow the tray to extend outside the housing. In some cases, the hinges are "external" hinges that are at least partially located outside of the profile of the housing. External hinges effectively place the axis of rotation of door outside of the profile, or outline, of the housing regardless of whether door is in an open position or a closed position. Unfortunately, however, external hinges increase the overall thickness of the general purpose computer, and are often considered to be aesthetically non-pleasing since they protrude from the housing.

In other cases, the hinges may be "internal" hinges that are at least partially located inside the profile of the housing. Internal hinges effectively place the axis of rotation of door inside the profile of the housing. The use of internal hinges enables door to open out from housing, and typically does not affect the thickness of the general purpose computer, i.e., internal hinges generally do not increase the profile of housing. The placement of internal hinges within the profile of the housing generally requires the presence of relatively significant gaps between the door and the opening. The gaps enable the door to rotate with respect to the internal hinges. While internal hinges generally have no affect on the profile of the housing, the presence of gaps is often undesirable due at least in part to the fact that they may expose the internal components to unwanted materials, e.g., dust particles, or moisture. Additionally, the gaps may be unpleasing to the eye (e.g., makes the housing look cheap).

Recently, the optical disk door has been configured to move relative to the hinge in order to overcome some of the problems associated with gaps formed between the door and the housing, i.e., the movement allows the position of the door to adjust to the position of the opening in the housing. By way of example, the G4 Tower, manufactured by Apple Computer of Cupertino, Calif., has included such a door mechanism. In this particular implementation, a planar door is allowed to move with one degree of freedom relative to a hinge, which pivotally couples the planar door to a planar portion of a housing. In particular, the planar door is allowed to rotate about a single axis so as to allow the planar door to conform to the opening of the planar housing in one direction. Unfortunately, however, one degree of freedom does not necessarily produce the desired effect, i.e., it does not always eliminate gaps between the door and the housing. As should be appreciated, the door and housing are defined by more than one dimension and thus one degree of freedom cannot correct for gaps formed in multiple directions. This is especially true for complicated designs that include doors and housings formed by three dimensions (e.g., x, y and z).

FIG. 1 is an exploded perspective view diagram of a door mechanism 1 used in the G4 Tower. The door mechanism 1 includes a door frame 2, a hinge member 3 and a door 4. The door frame 2, which includes an opening 5, is configured to be attached to the housing of the G4 Tower. The hinge member 3 is pivotally attached to the door frame 2 via a pivot pin 6 and mounts 7. The door 4 is movably coupled to the hinge member 3 via a flexure 8 disposed on the hinge member 3 and slot 9 disposed on the back of the door 4, i.e., the flexure 8 is inserted into the slot 9. The hinge member 3 also includes a pair of guides 10 that receive bosses 11 located on the door 4. The bosses 11 help to keep the door 4 on the flexure 8. The bosses 11 also constrain the movement of the door 4 to limited rotation about the z axis in the x and y plane, and the flexure 8 provides a biasing force to stabilize the movement. As should be appreciated, the bosses 8 and guides 10 are closely dimensioned thereby preventing movement in the x and z directions.

Thus, there is a need for improved approaches for accessing internal components of computing devices. Moreover, there is a need for improved approaches that allow a door to open and close without producing substantial cracks or gaps between the door and the housing.

SUMMARY OF THE INVENTION

The invention relates, in one embodiment to a computer. The computer includes a housing having an opening. The computer also includes a door that is movably coupled to the housing via a linkage mechanism. The linkage mechanism allows the door to move between a closed position where the door is placed against the housing and in front of the opening to prevent access therethrough, and an opened position where the door is placed away from the opening to allow access therethrough. The computer further includes a gimbal mechanism that allows the door to move relative to the linkage mechanism while constraining the door to the linkage mechanism. The gimbal mechanism provides a tight fit between the door and the housing when the door is in the closed position.

The invention relates, in another embodiment, to a computer door mechanism with a gimballing feature. The mechanism includes a pivot hinge including a support member that is pivotally coupled to a pivot mount. The mechanism also includes a door panel that includes protrusions that are movably constrained to the support member. The protrusions move relative to the support member in order to allow the door to move with multiple degrees of freedom relative to the support member.

The invention relates, in another embodiment, to a general purpose computer. The general purpose computer includes an enclosure including a door. The general purpose computer also includes a linkage mechanism that couples the door to the enclosure. The linkage mechanism produces a sliding effect that allows the door to slide relative to the outer surface of the enclosure so as to open and close the door.

BRIEF DESCRIPTION OF THE DRAWINGS

The invention may best be understood by reference to the following description taken in conjunction with the accompanying drawings in which:

FIGS. 6A and 6B are broken away side views, in cross section, of a base with a door, in accordance with one embodiment of the present invention.

FIGS. 7A and 7B are broken away front views of a base with a door, in accordance with one embodiment of the present invention.

FIG. 10A is an exploded perspective view of a pivot hinge with a gimbal feature, in accordance with one embodiment of the present invention.

FIGS. 13C and 13D are broken away interior views of a four bar linkage coupling a door to an enclosure, in accordance with one embodiment of the present invention.

DETAILED DESCRIPTION OF THE INVENTION

Embodiments of the invention are discussed below with reference to FIGS. 2–13. However, those skilled in the art will readily appreciate that the detailed description given herein with respect to these figures is for explanatory purposes as the invention extends beyond these limited embodiments.

Figure 1:
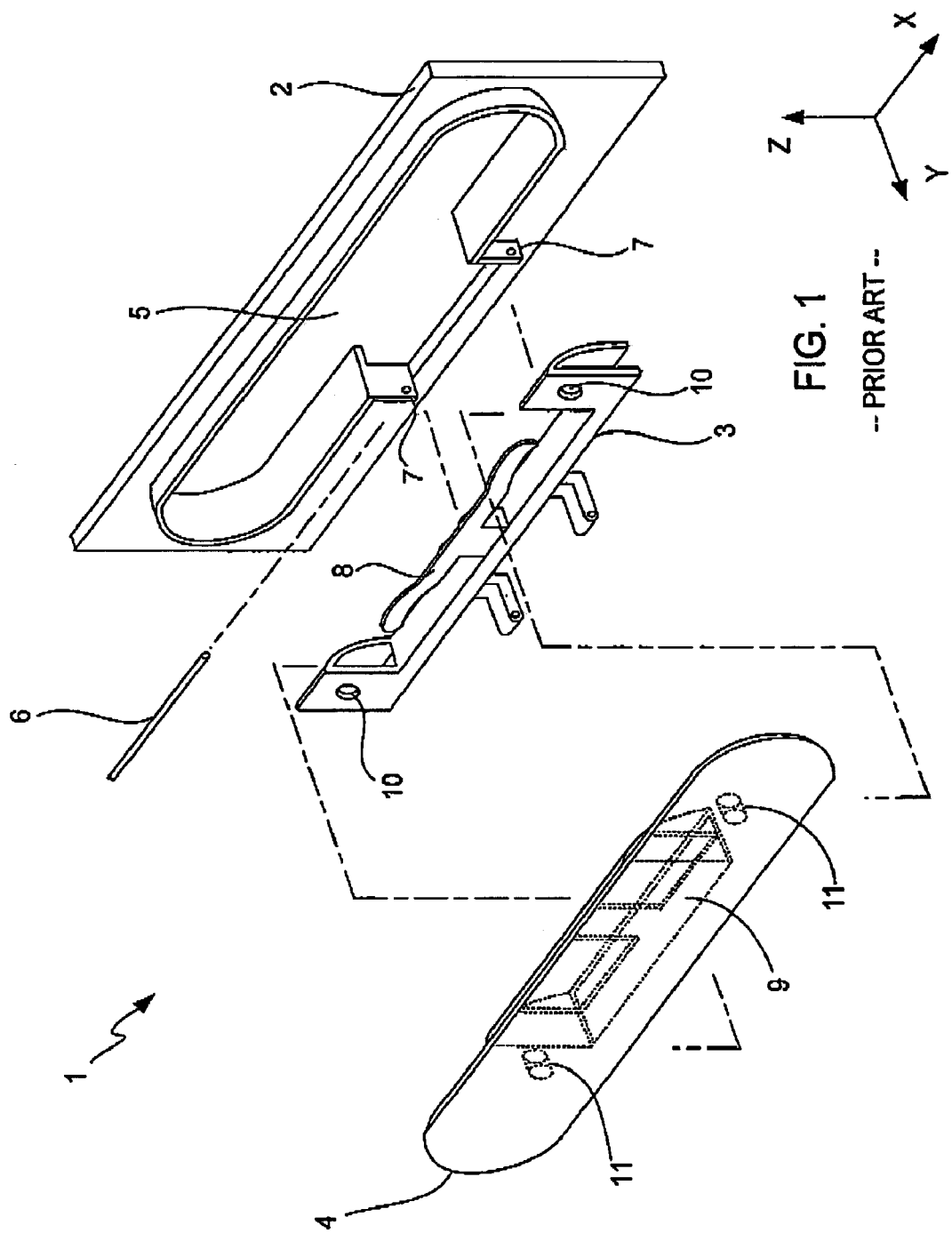
FIG. 1 is diagram of an exemplary door mechanism.
Figure 2:
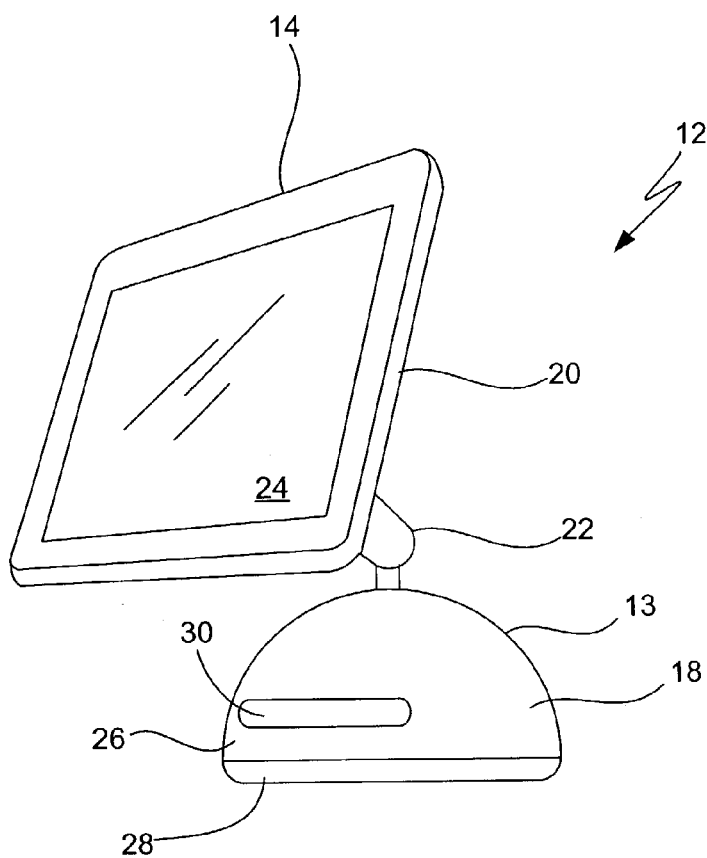
FIG. 2 is a perspective view of a computer system, in accordance with one embodiment of the present invention.

FIG. 2 is a perspective diagram of a computer system 12, in accordance with one embodiment of the invention. The computer system 12 generally includes a base 13 and a monitor 14 operatively coupled to the base 13. The base 13 and monitor 14 may be separate components or they may be integrated into a single component. In the illustrated embodiment, the base 13 and monitor 14 are separate components, i.e., they each have their own housing. That is, the base 13 includes a base housing 18 and the monitor 14 includes a monitor housing 20. Both housings 18 and 20 are configured to enclose various internal components associated with operation of the respective devices. In general the housings 18, 20 serve to surround their internal components at a peripheral region thereof so as to cover and protect their internal components from adverse conditions. In some cases, as shown, the monitor 14 may attached to the base 13 via a support mechanism 22 that allows the monitor 14 to rotate and/or pivot relative to the base 13. It should be noted, however, that this is not a limitation and that conventional set-ups may be used (e.g., all in one systems that incorporate a monitor and base together in a single housing or separated systems that have a monitor housing and a base housing that are decoupled from one another). By way of example, the computer system may be a general purpose computer such as the iMac computer manufactured by Apple Computer of Cupertino, Calif.

With regards to the base 13, the internal components may be processors, controllers, bridges, memory and the like. Often these internal components take the format of integrated circuits; however, the internal components can take various other forms (e.g., circuit boards, cables, fans, power supplies, batteries, capacitors, resistors). The internal components may also be various I/O devices such as a hard drive, a disk drive, a modem and the like. The base 13 may also include a plurality of I/O connectors for allowing connection to peripheral devices such as a mouse, a keyboard, a printer, a scanner, speakers and the like. With regards to the monitor 14, the internal components may be a display screen 24 used to display the graphical user interface (including perhaps a pointer or cursor) as well as other information to a user. By way of example, the display screen may be a liquid crystal display (LCD).

The base and monitor housings 18 and 20 generally define the shape or form of the base and monitor 13 and 14, respectively, i.e., the contour of the base housing 18 embodies the outward physical appearance of the base 13 and the contour of the monitor housing 20 embodies the outward physical appearance of the monitor 14. The contour may be rectilinear, curvilinear or both. In the illustrated embodiment, the base housing 18 is curvilinear. In particular, the base housing 18 substantially forms a hemisphere or half sphere. It should be understood, however, that this is not a limitation and that the form and shape of the base housing 18 may vary according to the specific needs or design of each computer system 12. By way of example, the base housing 18 may be formed in shapes such as a box, cube, a cylinder, a pyramid, a cone, or a full sphere, or in shapes such as a combination of the above or an object such as an apple, a house, a car or the like.

The base housing 18 typically includes a top case 26 and a bottom case 28 that serve to support the internal components in their assembled position within the base 13. In some instances, the integrated circuit chips and other circuitry may generate unwanted electrical emissions (EMI), and therefore, the base 13, and more particularly the top and bottom cases 26 and 28, may also be configured to contain electronic emissions therein. For example, the top and bottom cases may consist of an outer protective shell and an inner Faraday shield.

The base 13 may also include one or more doors 30 configured to cover openings that are disposed through the base housing 18. The openings provide access to the internal components enclosed within the base housing 18. The doors 30 generally consist of one or more panels that swing, rotate or slide relative to the base housing 18 so as to move between an open and closed position. By way of example, the doors may be trap doors that hide openings to memory boards, connectors ports and the like, or bezel doors that hide openings to disk drives such as CD or DVD drives.

Figure 3A:
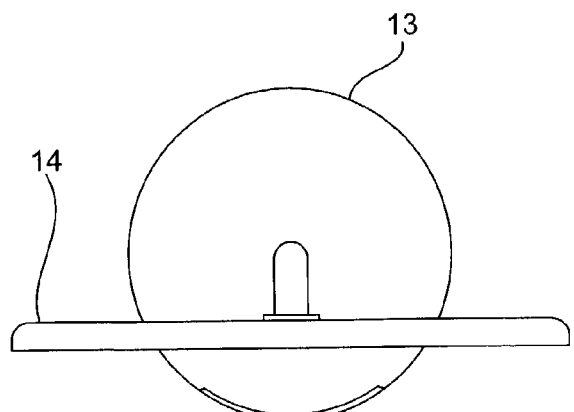
FIG. 3A is a top view of a computer system, in accordance with one embodiment of the present invention.
Figure 3B:
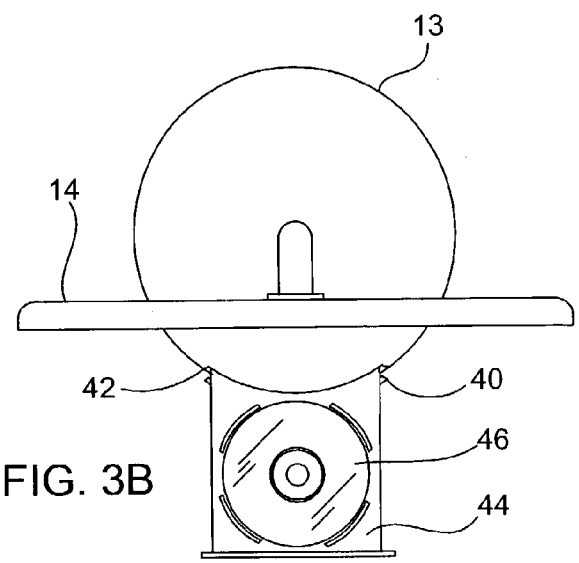
FIG. 3B is a top view of a computer system, in accordance with one embodiment of the present invention.

Referring to FIGS. 3A and 3B, the movable bezel door 30 is configured for opening and closing off an opening 42 to a CD and/or DVD disk drive housed within the base 12. The CD/DVD drive is typically used to store and retrieve data via a CD or DVD disk. Although not shown, the CD/DVD drive generally includes drive components for reading and writing a compact disc (CD) and/or a digital Versatile disc (DVD) and transport components for carrying the CD and DVD discs to and from the drive components. By way of example, the drive components may include a laser, light sensing diode, and a spindle motor, and the transport components may include a movable tray 44. As shown in FIG. 3B, the movable tray 44 moves in and out of the base 13 through the opening 42 when the bezel door 30 is opened, i.e., moved out of the way. As is generally well known, the movable tray 40 is configured to carry the optical disk 46 so that it may be removed or inserted into the CD/DVD drive located within the base 13.

Figure 5:
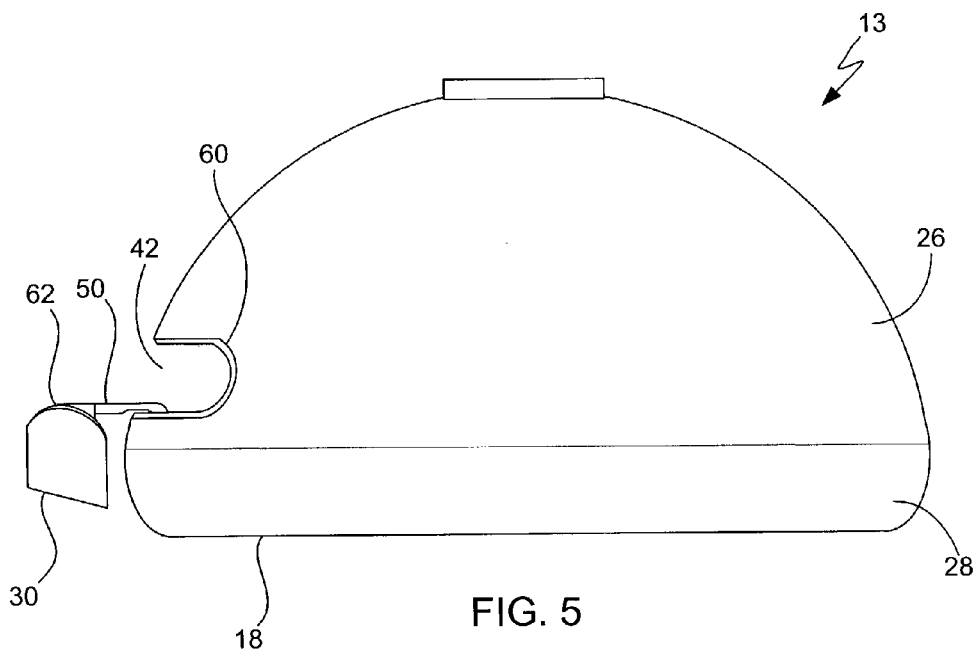
FIG. 5 is a side view of a base of a computer system with an opened door, in accordance with one embodiment of the present invention.
Figure 4:
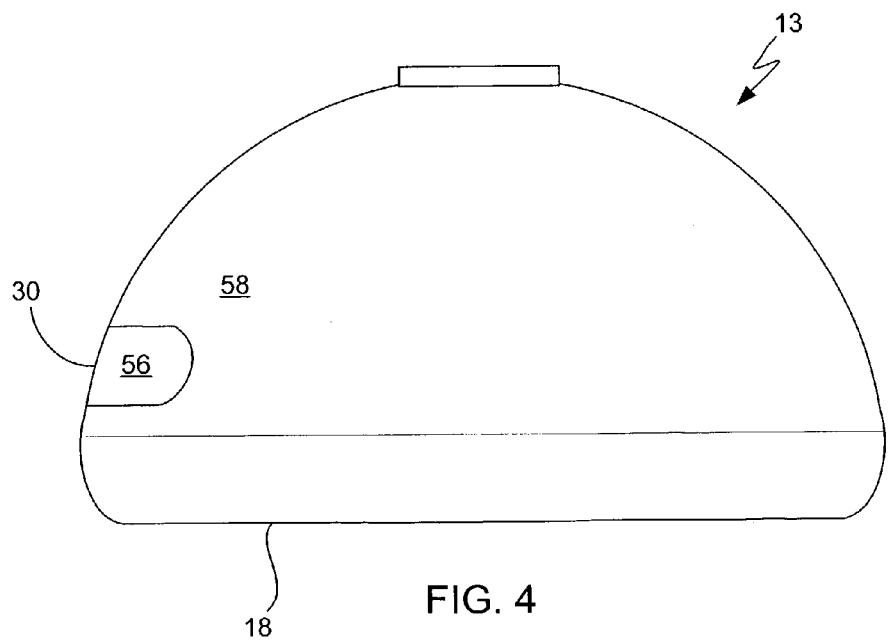
FIG. 4 is a side view of a base of a computer system with a closed door, in accordance with one embodiment of the present invention.

Referring to FIGS. 4 and 5, the bezel door 30 is movably coupled to the base housing 18. For example, it may be coupled to the base housing 18 via a linkage mechanism 50 that allows the bezel door 30 to move relative to the base housing 18 (e.g., in and out of the opening). The linkage mechanism 50 is generally hidden from view when the door 30 is closed thereby allowing the outer periphery of the door 30 to be flush with the outer periphery of the base housing 18. The linkage mechanism 50 may be widely varied. For example, the linkage mechanism 50 may correspond to a pivot hinge, a four bar linkage or the like. The pivot hinge allows the door 30 to pivot relative to the base housing 18 between the open and closed position. The four bar linkage, on the other hand, allows the door 30 to swing along a prescribed path relative to the base housing 18 between the open and closed position. For example, the door 30 may translate along the prescribed path relative to the base housing 18 between the open and closed position.

In either case, the linkage mechanism 50 allows the bezel door 30 to move from a closed position, placing the bezel door 30 in front of the opening 42 (as shown in FIG. 4), and an opened position, placing the bezel door 30 away from the opening 42 (as shown in FIG. 5). In FIG. 4, the bezel door 30 is moved in front of the opening 42 thus hiding the opening 42 and the internal components of the base 13 (e.g., CD/DVD drive) from view. In FIG. 5, the bezel door 30 is moved away from the opening 42 so that the movable tray can move out of the base 13. The linkage mechanism 50 may be connected to the top or bottom case 26 or 28. In most cases, the linkage mechanism 50 is connected to the case that has the opening 42 disposed therethrough.

As shown in FIG. 4, the bezel door 30 is configured to follow the contour of the base housing 18 so that the base 13 has an overall look that is uniform when the bezel door 30 is closed. For example, the bezel door 30 has a curvilinear shape or more particularly a spherical shape that coincides with the spherical shape of the base housing 18, i.e., both parts are defined in 3 dimensions (X, Y, Z). In most cases, the bezel door 30 is configured to be placed within the opening 42 such that the outer peripheral surface 56 of the bezel door 30 is substantially flush with the outer peripheral surface 58 of the base housing 18.

As shown in FIG. 5, the housing 18 includes a mating surface 60 at the edge of the opening 42 that mates with a coinciding mating surface 62 at the edge of the bezel door 30 when the bezel door 30 is closed. The mating surfaces 60 and 62 are generally configured to place the outer peripheral surfaces 56 and 58 in their desired flush position. For example, the housing mating surface 60 may serve as a stop for locating the outer peripheral surface 56 of the bezel door 30 in the desired position (flush) relative to the outer peripheral surface 58 of the base housing 18. The mating surfaces 60 and 62 may be widely varied. However, in the illustrated embodiment, the mating surfaces 60 and 62 are formed as coinciding chamfered edges.

Various design difficulties are presented when the housing 18 includes complex shapes and decorative features as in the present design (e.g., hemispherical, spherical). One of those design difficulties is in controlling the cosmetic reveal (e.g., gaps and cracks) between the door 30 and the base housing 18 when the door 30 is closed, i.e., it can be extremely difficult to mate parts defined by three dimensions. For example, as shown in FIGS. 6A and 7A, the linkage mechanism may place the door 30 in an offset position relative to the base housing 30 thus forming cracks and gaps 64 therebetween.

In one embodiment, the bezel door 30 is configured to gimbal relative to the linkage mechanism 50 in order to overcome any offset door positions. By gimbal, it is generally meant that the bezel door is able to float in space relative to the linkage mechanism while still being constrained thereto. The gimbal allows the door 30 to shift away from the offset door position defined by the linkage mechanism 50 so as to produce a tight fit between the door 30 and the base housing 18 when the door is closed, i.e., the gimbal substantially eliminates gaps and cracks normally found therebetween. By way of example, as shown in FIGS. 6B and 7B, the gimbal may allow the door 30 to shift away from the offset door position (as shown in FIGS. 6A and 7A) into mating engagement with the base housing 18.

The gimbal may be provided using a gimbal mechanism 52 that is disposed between the bezel door 30 and the linkage mechanism 50. The gimbal mechanism 52 may allow the bezel door 30 to move in single or multiple degrees of freedom (DOF) relative to the linkage mechanism 50. For example, movements in the x, y and/or z directions and/or rotations about the x, y, and/or z axes ($\theta_x, \theta_y, \theta_z$). The degrees of freedom may be implemented through one or more rotations, pivots, translations, flexes and/or the like. By way of example, the bezel door 30 may be coupled to the linkage mechanism 50 via one or more pivot joints, translating joints, ball and socket joints, flexure joints and the like. Moreover, the bezel door 30 may be coupled to the linkage mechanism via a combination of the above, as for example, pivot/translating joints, pivot/flexure joints, pivot/ball and socket joints, translating/flexure joints and the like.

The DOF of the bezel door 30 generally depends on the number and type of joints used. In one embodiment, the gimbal mechanism 52 is configured to allow the door 30 to move in one degree of freedom (e.g., along the x axis). In another embodiment, the gimbal mechanism 52 is configured to allow the door 30 to move in two degrees of freedom (e.g., along the y and z axis). In another embodiment, the gimbal mechanism 52 is configured to allow the door 30 to move in three degrees of freedom (e.g., along the y and z axis and about the x axis). In another embodiment, the gimbal mechanism 52 is configured to allow the door 30 to move in four degrees of freedom (e.g., along the x and z axis and about the x and y axis). In another embodiment, the gimbal mechanism 52 is configured to allow the door 30 to move in five degrees of freedom (e.g., along the x, y and z axis, and about the x and y axis). In yet another embodiment, the gimbal mechanism 52 is configured to allow the door 30 to move in six degrees of freedom (e.g., along the x, y and z axis, and about the x, y and z axis). Multiple degrees of freedom are generally preferred when mating parts with unique geometries such as the spherical door and housing.

Figure 8A:
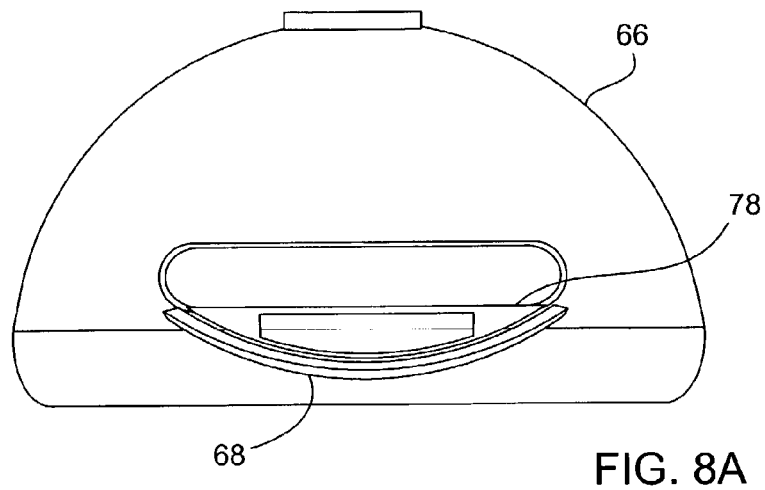
FIG. 8A is a front view of a base of a computer system with an opened door, in accordance with one embodiment of the present invention.
Figure 8B:
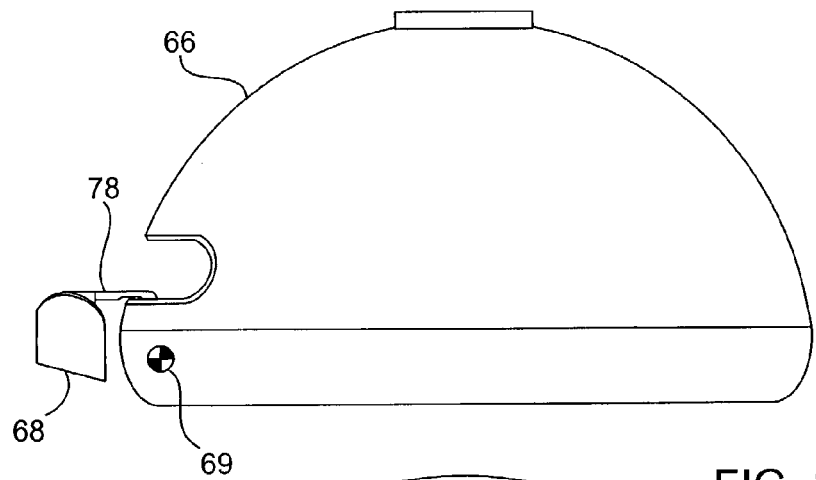
FIG. 8B is a side view of a base of a computer system with an opened door, in accordance with one embodiment of the present invention.
Figure 8C:
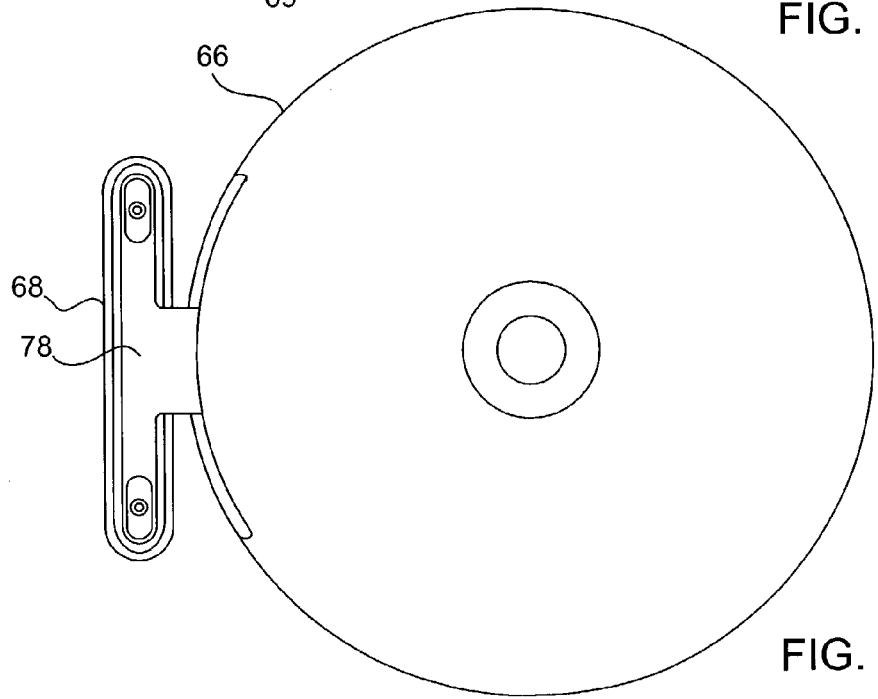
FIG. 8C is a top view of a base of a computer system with an opened door, in accordance with one embodiment of the present invention.
Figure 8D:
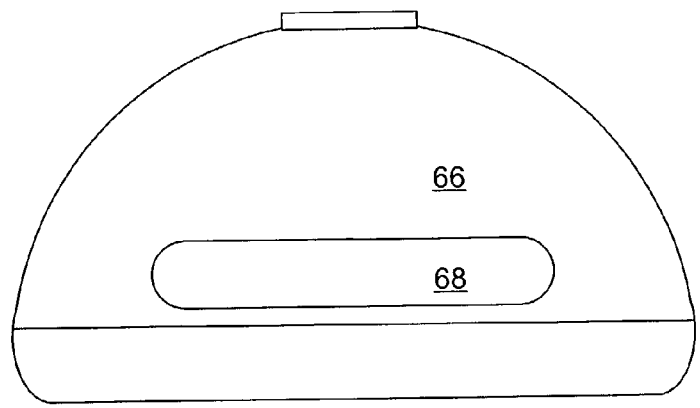
FIG. 8D is a front view of a base of a computer system with a closed door, in accordance with one embodiment of the present invention.
Figure 8E:
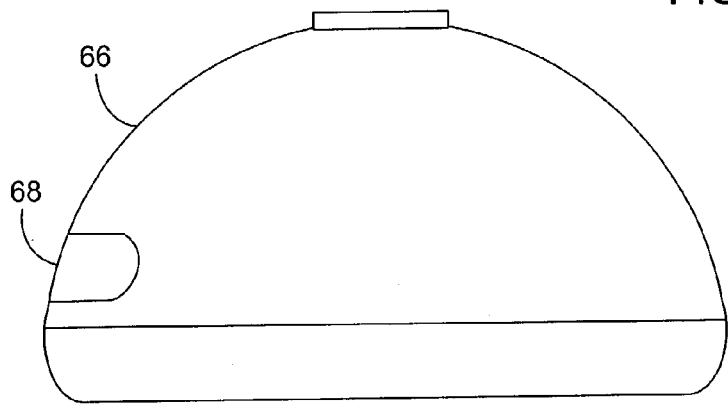
FIG. 8E is a side view of a base of a computer system with a closed door, in accordance with one embodiment of the present invention.
Figure 8F:
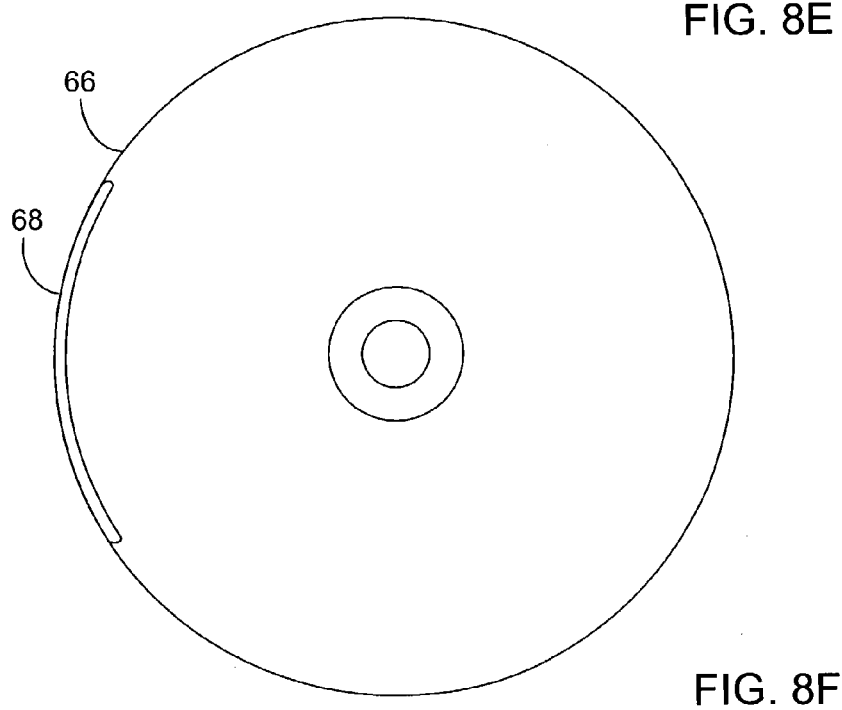
FIG. 8F is a top view of a base of a computer system with a closed door, in accordance with one embodiment of the present invention.

FIGS. 8A–8F are diagrams of a computer enclosure 66 with a bezel door 68, in accordance with one embodiment of the present invention. By way of example, the computer enclosure 66 and bezel door 68 may generally correspond to the base and door shown in the previous Figures. In this particular embodiment, the door 68 is coupled to the enclosure 66 with a pivot hinge mechanism 78. The pivot hinge mechanism 78 causes the bezel door 68 to rotate about an axis 69. The pivoting effect allows the bezel door 68 to move between an open position (as shown in FIGS. 8A–8C) and a closed position (as shown in FIGS. 8D–8F). The pivot hinge mechanism is configured to remain hidden from view when the door is closed, and to drape around the enclosure 66 when the door is opened.

Figure 9A:
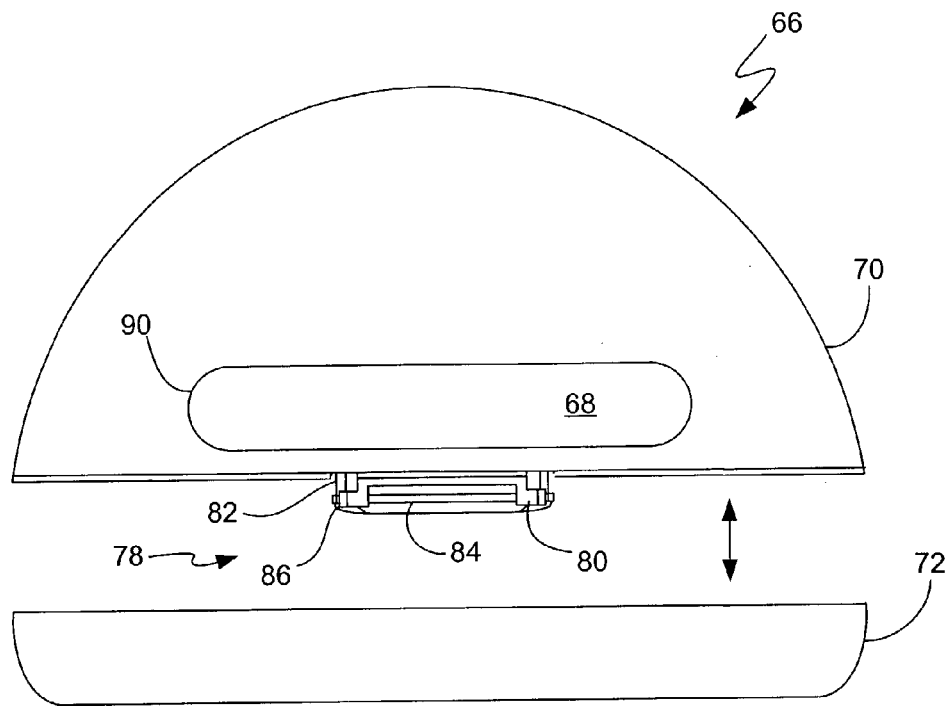
FIG. 9A is an exploded front view of a base, in accordance with one embodiment of the present invention.
Figure 9B:
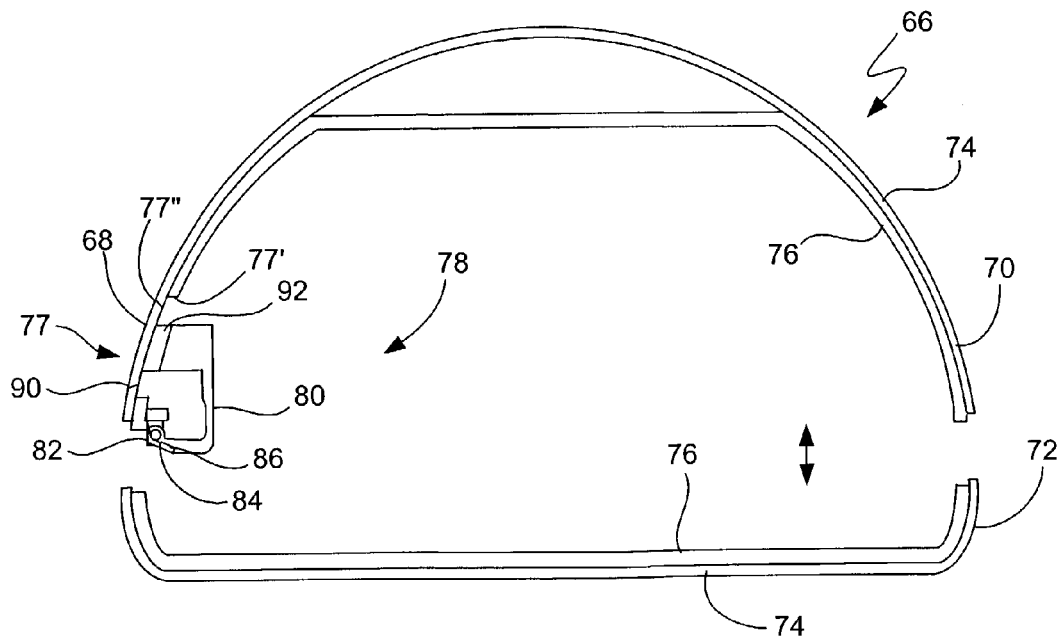
FIG. 9B is an exploded side view, in cross section of a base, in accordance with one embodiment of the present invention.

Referring to FIGS. 9A and 9B, the computer enclosure 66 and the bezel door 68 will be described in greater detail. As shown, the computer enclosure 66 includes a top case 70 and a bottom case 72. The two cases 70 and 72 may be attached using any suitable attachment means. Each of the cases 70 and 72 includes an outer shell 74 and an inner shell 76. The two shells 74 and 76 may also be attached using any suitable attachment means. In some cases, the inner shell 76 serves as a Faraday shield. The two shells may be formed from any suitable material. For example, the outer shell 74 may be formed from plastic and the inner shell 76 may be formed from metal. An opening 77 is disposed in the top case 70 through the outer and inner shells 74 and 76. In most cases, the opening 77' in the inner shell 76 is larger than the opening 77" in the outer shell 74. It should be noted that the above mentioned configuration is not a limitation and that it may vary according to the specific needs of the device. For example, the top and bottom cases may be formed from a single component or more than two components. Additionally, the opening may be disposed in the bottom case rather than the top case or as a gap between the two cases in some circumstances.

As mentioned, the bezel door 68 is coupled to the top case 70 via a pivot hinge mechanism 78. The pivot hinge mechanism 78 generally includes an arm 80 that is pivotally coupled to a pivot mount 82 via a pivot pin 84. The pivot mount 82 is attached to the inner shell 76 and the arm 80 is attached to the bezel door 68. The arm 80 is preferably configured to provide a swing path that leaves the bezel door 68 as well as the arm 80 in a position that does not block the opening 77 when the bezel door 68 is in the opened position. The arm 80 is also preferably configured to provide a swing path that leaves the pivot hinge mechanism 78 inside the enclosure 66 so that it is hidden from view when the bezel door 68 is in the closed position. In fact, the arm 80 is U-shaped such that when the bezel door 68 is in the opened position the arm 80 and bezel door 68 drape around the top case 70 and when the bezel door 68 is in the closed position the arm 80 is hidden behind the bezel door 68 and the top case 70. The pivot hinge mechanism 78 may also include a spring element 86 for biasing the bezel door 68 in either the opened or closed position. By way of example, the spring element 86 may be a torsion spring. In most cases, the bezel door 68 is biased in the closed position. In this particular configuration, a movable tray of a CD/DVD drive disposed inside the enclosure 66 would push against the inside of the bezel door 68 or the arm 80 of the pivot hinge 78 in order to open the door 68.

The bezel door 68 is preferably configured to have a tight fit to the computer enclosure 66 with minimal cosmetic reveal 90 (e.g., gaps) between the mating surfaces of the bezel door 68 and opening 77. Unfortunately, however, the unique geometry of the enclosure 66 (e.g., curvilinear or spherical) has made it increasingly difficult to control (minimize) the reveal 90. For example, because of the spherical nature of the top case 70, the axis of the hinge mechanism 78 is placed a distance from the bezel door 68 thereby increasing the tolerance stack-up from the axis to the bezel door/base housing interface. The tolerance stack up may cause the bezel door position to shift, which as a result may cause the mating surfaces between the bezel door 68 and the opening 77 to be misaligned. This misalignment may form large gaps that are undesirable, i.e., the opening 77 is not completely filled with the bezel door 68 when the bezel door 68 is closed and thus larger than desired gaps are created. Large gaps are generally undesirable because they expose the inside of the enclosure 66 to unwanted materials such as dust particles or moisture and they alter the aesthetics (look and feel) of the product in a non trivial manner, i.e., large gaps may adversely effect the industrial design of the product or be unpleasing to the eye (look cheap).

To counter this effect and provide a more compliant design, the bezel door 68, in accordance with one embodiment of the present invention, may be coupled to the arm 80 via a gimbal mechanism 92. The gimbal mechanism 92 allows the door 68 to gimbal relative to the hinge mechanism 78. The gimbal permits the bezel door 68 to shift freely so that it sits flush with the opening 77 even when it would otherwise be misaligned because of the stacking tolerances of the hinge mechanism 78. That is, the gimbal allows the bezel door 68 to move in at least one degree of freedom relative to the arm 80 so as to provide a tight fit and desired cosmetic reveal 90 between the mating surface of the bezel door 68 and the mating interface of the opening 77 (e.g., between chamfers), i.e., the position of the bezel door 68 conforms and adjusts to the position of the opening 77. In one particular embodiment, the gimbal is configured to allow the door to move in 6 DOF relative to the hinge mechanism, i.e., the door is capable of moving along the x, y and z axis and rotating about the x, y and z axis. 6 DOF generally prevents mating problems associated with parts having complicated shapes.

Figure 10B:
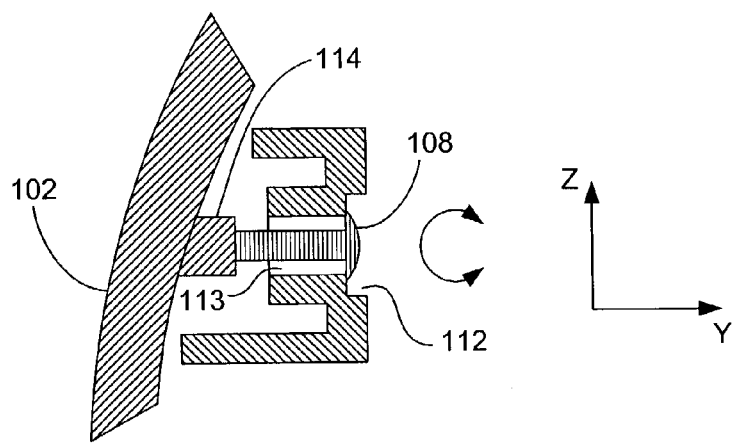
FIG. 10B is a side view, in cross section, of the pivot hinge shown in FIG. 10A, in accordance with one embodiment of the present invention.
Figure 10C:
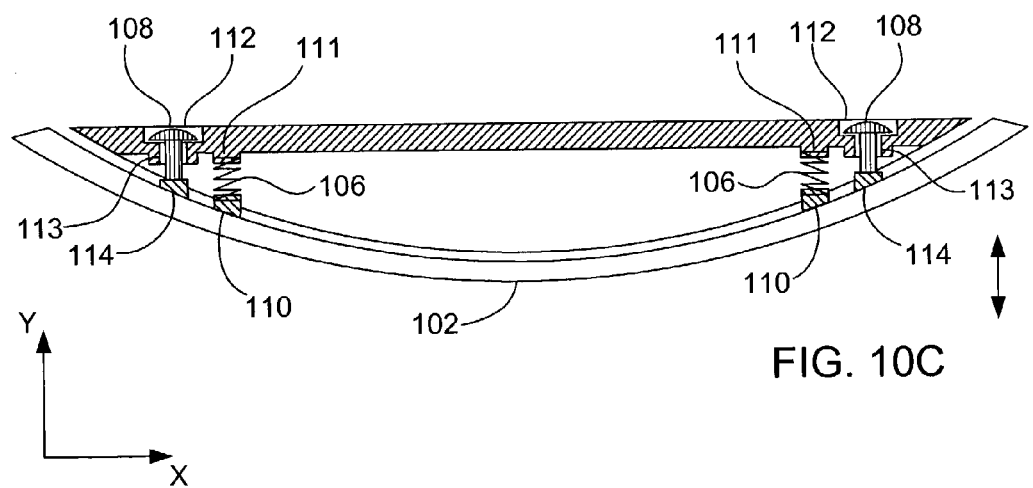
FIG. 10C is a top view, in cross section, of a pivot hinge shown in FIG. 10A, in accordance with one embodiment of the present invention.
Figure 10D:
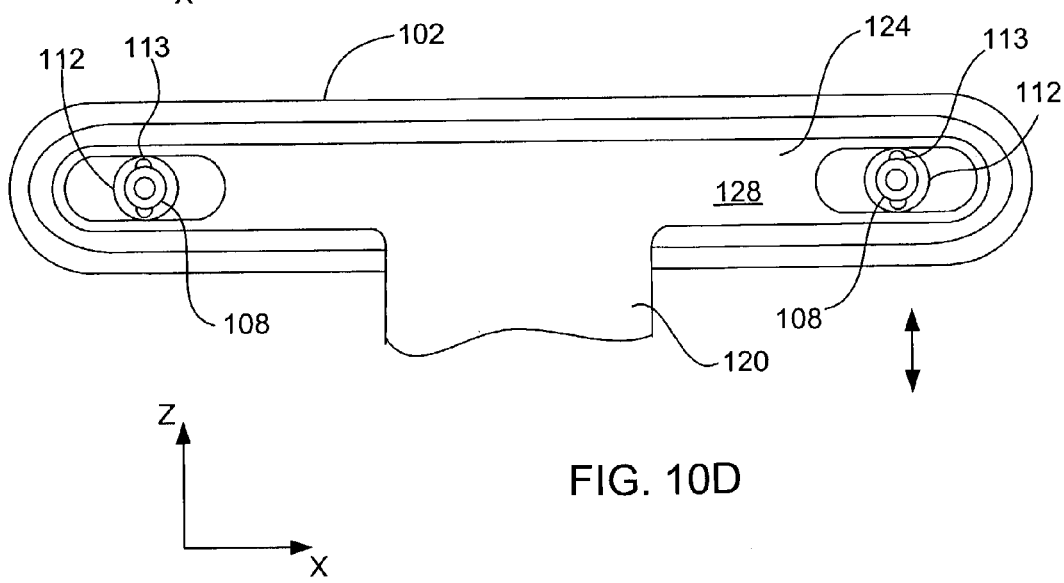
FIG. 10D is a back view of a pivot hinge shown in FIG. 10A, in accordance with one embodiment of the present invention.

FIGS. 10A–D are diagrams of a door and hinge mechanism 100, in accordance with one embodiment of the present invention. FIG. 10A is an exploded view of the door and hinge mechanism 100. FIG. 10B is a side elevation view, in cross section, of the door and hinge mechanism 100. FIG. 10C is a top view, in cross section, of the door and hinge mechanism 100. FIG. 10D is a back view of the door and hinge mechanism 100. By way of example, the door and hinge mechanism 100 may correspond to the hinge mechanism shown in FIG. 9. The door and hinge mechanism 100 generally includes a door panel 102 that gimbals relative to a pivot hinge 104. The door panel 102 is generally configured to cover an opening of a housing and it may be formed from a single or multiple layers. The pivot hinge 104, on the other hand, is configured for coupling the door panel 102 to the housing so that the door panel 102 may be opened or closed. The gimbal allows the door 102 to correct its position relative to the opening in the housing so as to produce a tight fit with minimal cosmetic reveal.

The gimbal is generally achieved by movably constraining the door panel 102 to a pivoting member 105 of the pivot hinge 104. For example, the door panel 102 may include one or more protrusions that are capable of moving within an opening or through hole of the pivoting member 105 while still being prevented from moving entirely out of the opening or through hole. Because the protrusions are an extension of the door panel 102, the protrusions allow the door panel 102 to move relative to the pivot hinge 104 when they move within the opening or though hole.

In the illustrated embodiment, the door panel 102 is movably constrained to the pivoting member 105 via a pair of shoulder bolts 108 that protrude out the back side of the door panel 102, and a pair of compression springs 106 that are disposed between the pivoting member 105 and the door panel 102. The shoulder bolts 108 allow the door panel 102 to move relative to the pivot hinge 104 and the compression springs 106 hold the door panel 102 in a known position relative to the pivot hinge 104 while allowing the door panel 102 to move in multiple directions when an external force is applied thereto. The compression springs 106 are spaced apart symmetrically from the center of the door panel 102. The compression springs 106 are also disposed between the door panel 102 and the pivoting member 105 of the pivot hinge 104. One end of the compression spring 106 is fit to a boss 110 located on the door panel 102 and the other end of the compression spring 106 is fit to a boss 111 located on the pivoting member 105. The shoulder bolts 108 are mounted to the door panel 102 through a through hole 113 in a counter sunk opening 112 in the pivoting member 105, i.e., the shoulder bolts 108 link the door panel 102 to the pivoting member 105. More particularly, the shoulder bolts 108 are threaded to a nub 114 extending from the inside of the door panel 102. The nubs 114 are generally positioned outside the bosses 110 although this is not a requirement. The shoulder bolts 108 also trap the compression springs 106 between the door panel 102 and the pivoting member 105 so that they exert a spring bias between the door panel 102 and the pivoting member 05. That is, the shoulder bolts provide some pre-compression to the compression spring 106.

The bolts 108 and through holes 113 are generally dimensioned to permit movement of the door panel 102 relative to the pivot hinge 104. That is, the diameter of the through hole 113 of the countersunk opening 112 may be large as compared to the diameter of the bolt 108 thereby permitting the bolt 108 to move about the through hole 113. For example, the bolt 108 may translate about the through hole 112 in the x and/or z directions. In some cases, the through hole 113 has a shape that is configured to limit the amount of translation in the x and/or z directions. For example, the shape may permit translation to only one direction or it may permit a greater amount of translation in one direction as compared to another direction. In either case, the shape is generally oblong, i.e., thin in one direction and thick or long in the other. The thinner side limits the amount of translation while the thick or long side allows full translation. If the thin side coincides with the diameter of the bolt then the bolt can only move in one direction. Further, the length of the through hole 113 of the countersunk opening 112 may be small as compared to the length of the bolt 108 thereby permitting the bolt 108 to move through the through hole 113 (e.g., axially). For example, the bolt 108 may translate through the through hole 113 in the y direction. The amount of translation in the y direction can be controlled by the length of the bolt 108, i.e., the amount of translation decreases as the length of the bolt 108 approaches the length of the through hole 113. The size and shape of the through holes 113 as well as the length of the bolt 108 also determines the amount of rotation about the x, y and z axis.

In the illustrated embodiment, the gimbal allows the door panel 102 to move with six degrees of freedom relative to the pivot hinge 104 so as to provide a tight fit and desired cosmetic reveal between the mating surfaces of the door panel 102 and the housing, i.e., the door panel 102 can move in the x, y and z directions and it can rotate about the x, y and z axes ($\theta_x$ $\theta_y$ $\theta_z$). In particular, the door panel 102 can translate in the y direction along the y axis by axially moving the bolts 108 in and out of the through holes 113. The door panel 102 can also translate in the x direction along the x axis by shifting the bolts 108 side to side within the through holes 113. The door panel 102 can also translate in the z direction along the z axis by shifting the bolts 108 up and down within the through holes 113. As should be appreciated, a six degree of freedom gimbal door accommodates more complex housing geometries such as those described previously (e.g., hemispherical housing).

In the embodiment shown, the bolts 108 are configured longer than the through holes 113 and the through holes 113 have an oval shape. When assembled, the main motion of the shoulder bolt 108 in the through hole 113 is in the z direction with limited motion in the y direction due to the head of the bolt and other architectural obstructions, and limited motion in the x direction due to the oval shape of the through holes 113. The through holes 113 are oval so they allow the door 102 to translate more in the z direction than in the x direction, i.e., the oval shape is extended further in the z direction than in the x direction and thus the bolt can translate more in the z direction than in the x direction. The springs 106 provide a biasing force in the y direction.

Moreover, the door panel 102 can rotate about the y axis by moving one of the shoulder bolts 108 up and the other one down relative to their respective through holes 113, i.e., one bolt translates in a positive direction along the z axis while the other bolt translates in a negative direction along the z axis. The door panel 102 can also rotate about the x axis by tilting the door panel 102 up and down via the play that exists between the through holes 113 and the shoulder bolts 108. The door panel 102 can also rotate about the z axis by tilting the door 102 side to side via the play that exists between the through holes 113 and shoulder bolts 108 and when a difference in compression exists between the left and right springs 106. It should be noted that this particular embodiment is not a limitation and that the gimbal may vary according to the specific needs of each device.

As shown in FIG. 10A, the pivot hinge 104 and more particularly the pivoting member 105 includes a base 120, a pair of arms 122 and a support member 124 that are formed as a single component. The arms 122 extend from a first side of the base 120 and couple to a pivot mount 126. The support member 124 extends from a second side of the base 120 and couples to the door panel 102. The arms 122 and support member 124 are spaced apart from one another thereby forming an open space therebetween. This open space allows the hinge 104 to be draped around the housing when the door panel 102 is in the opened position. As shown, the countersunk openings 112 are located at opposing ends of the support member 124. The support member 124 includes a first member 128 and a second member 130. The first member 128 is substantially planar and is generally integrated with the base 120. The second member 130, on the other hand, is configured to follow the curvature of the curved door panel 102 (both radially and circumferentially). As should be appreciated, the bezel door 102 is curved so as to match the contour of a curved wall of a housing. In order to allow door movement, the second member 130 is generally spaced apart from the door panel 102. The planar first member 128 may include contact pads 132 that allow the movable tray to slide thereon. Furthermore, a support bar 133 may be provided to structurally support the complex shape of the door panel 102, i.e., the support member 133 helps the door panel 102 maintain its desired curvilinear shape. The support member 133 may be needed if the door panel 102 is thin or made from a flexible material.

The pivot mount 126, on the other hand, includes a pair of shoulders 134, each of which includes a through hole 136 for receiving a pivot pin 138. The pivot pin 138 is inserted through the through holes 136 and through corresponding through holes (not shown) in the arms 122 of the body 120 to pivotally couple the body 120 to the pivot mount 126. The through holes are generally disposed at the ends of the two arms 122. Torsion springs 140 may be provided to bias the body 120 relative to the pivot mount 126. This spring bias may be used to continuously hold the door shut when the door and hinge mechanism 100 is installed within a housing.

Figure 11A:
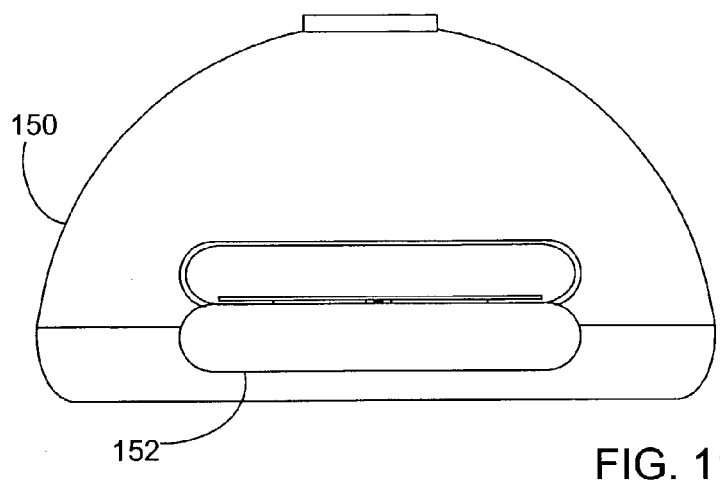
FIG. 11A is a front view of a base of a computer system with an opened door, in accordance with one embodiment of the present invention.
Figure 11B:
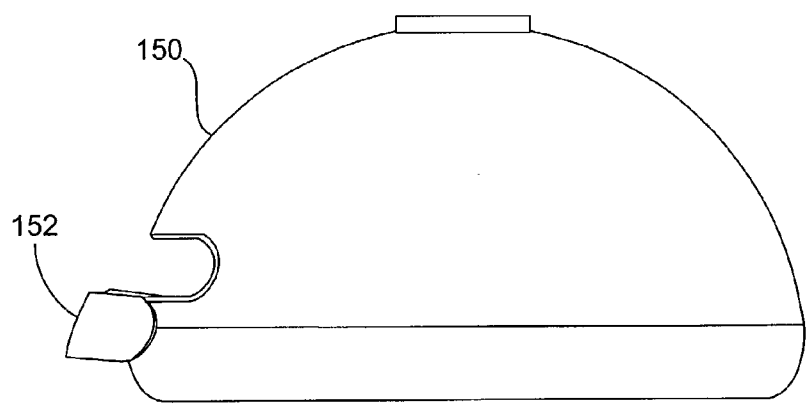
FIG. 11B is a side view of a base of a computer system with an opened door, in accordance with one embodiment of the present invention.
Figure 11C:
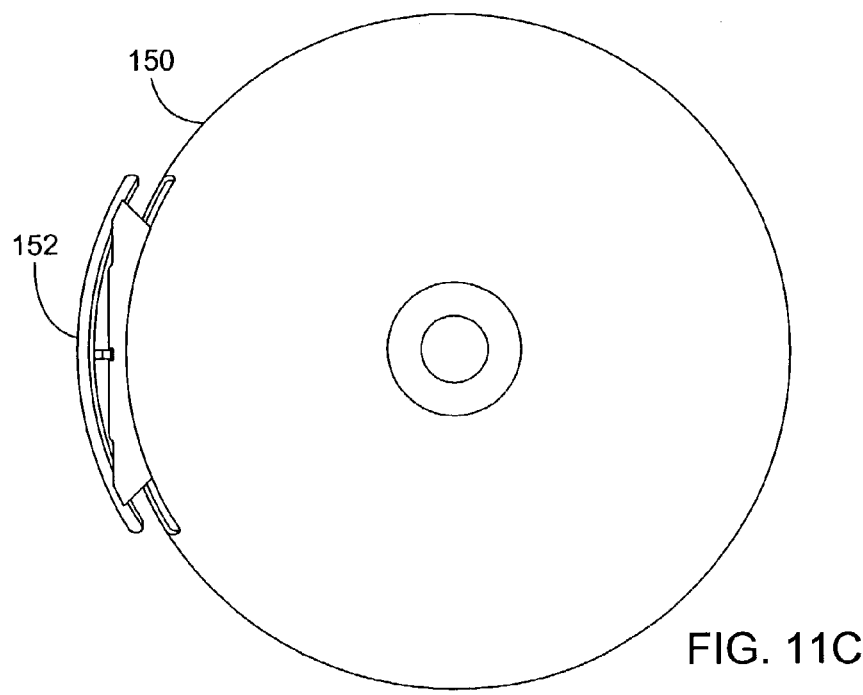
FIG. 11C is a top view of a base of a computer system with an opened door, in accordance with one embodiment of the present invention.
Figure 11D:
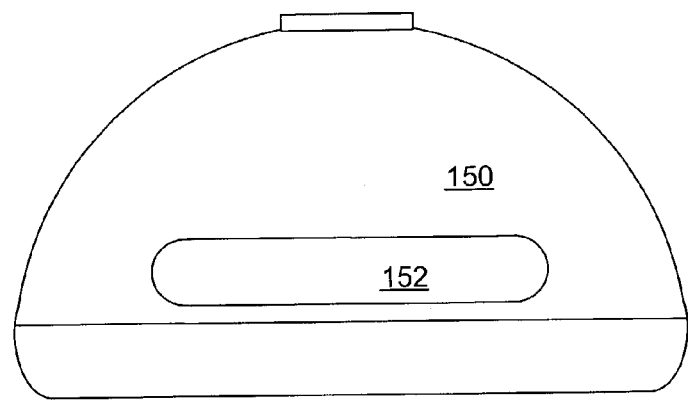
FIG. 11D is a front view of a base of a computer system with a closed door, in accordance with one embodiment of the present invention.
Figure 11E:
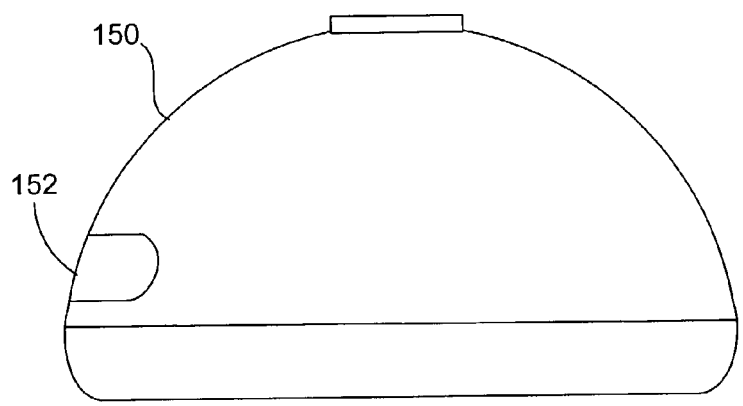
FIG. 11E is a side view of a base of a computer system with a closed door, in accordance with one embodiment of the present invention.
Figure 11F:
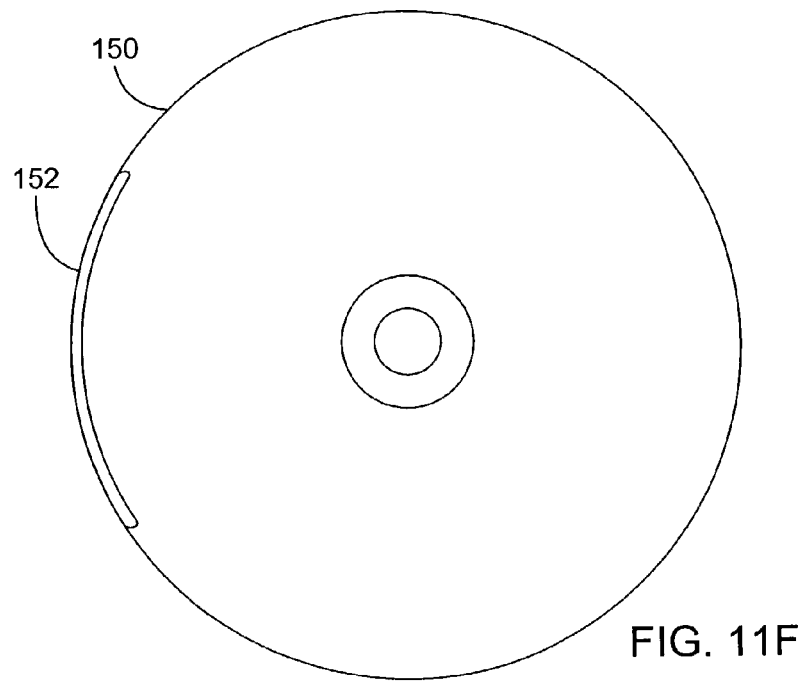
FIG. 11F is a top view of a base of a computer system with a closed door, in accordance with one embodiment of the present invention.

FIGS. 11A–11B are diagrams of a computer enclosure 150 with a bezel door 152, in accordance with another embodiment of the present invention. The enclosure 150 and bezel door 152 are similar to the enclosure and bezel door described in FIGS. 8A–8F, however instead of coupling the door 152 to the enclosure 150 with a pivot hinge, the door 152 is coupled to the enclosure 150 with a four bar linkage 156. The function of the four bar linkage 156 is to guide and control the motion of the bezel door 152. The four bar linkage 156 is extremely versatile in the type of motion that can be generated. For example, the four bar linkage can control a point in a plane such that it follows some prescribed path. In the illustrated embodiment, the four bar linkage 156 causes the bezel door 152 to slide up and down rather than rotate like a hinge. The sliding effect allows the bezel door 152 to remain substantially parallel to the outer surface of the enclosure 150 when moving between an open position (as shown in FIGS. 11A–11C) and closed position (as shown in FIGS. 11D–11F). The four bar linkage 156 also causes the bezel door 152 to move in and out of the opening 158 during its initial and final movements to and from the closed position. To some, this type of motion may be more aesthetically pleasing as the door follows the contour of the housing as it moves between positions.

Figure 12A:
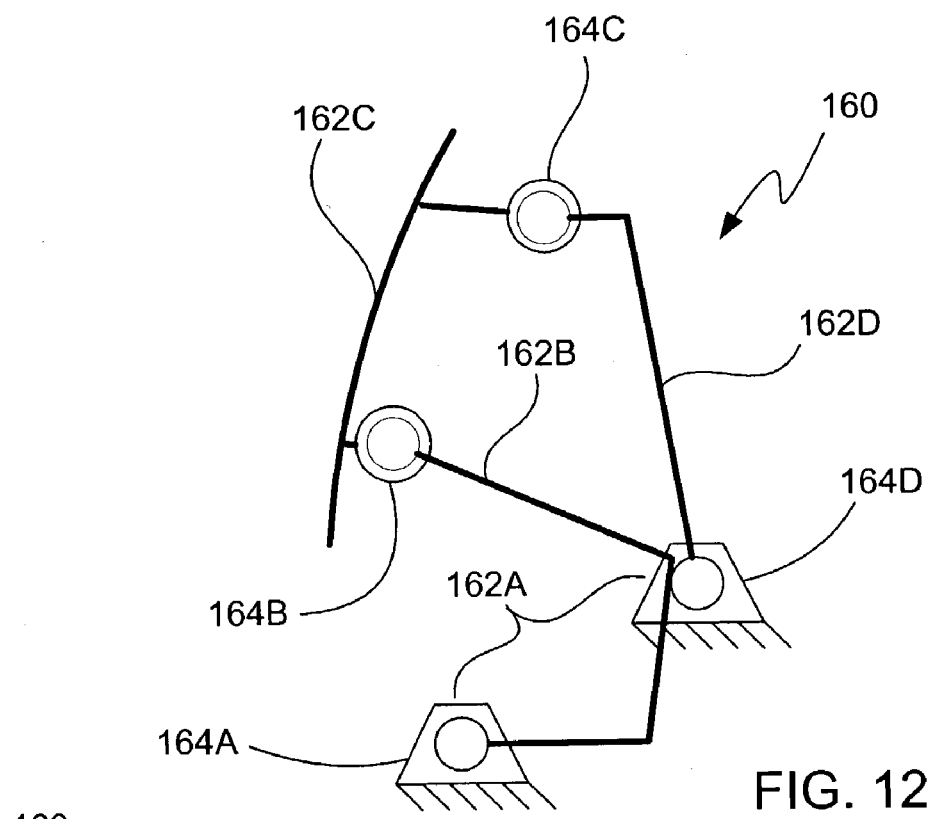
FIGS. 12A and 12B are simplified diagrams of a four bar linkage, in accordance with one embodiment of the present invention.
Figure 12B:
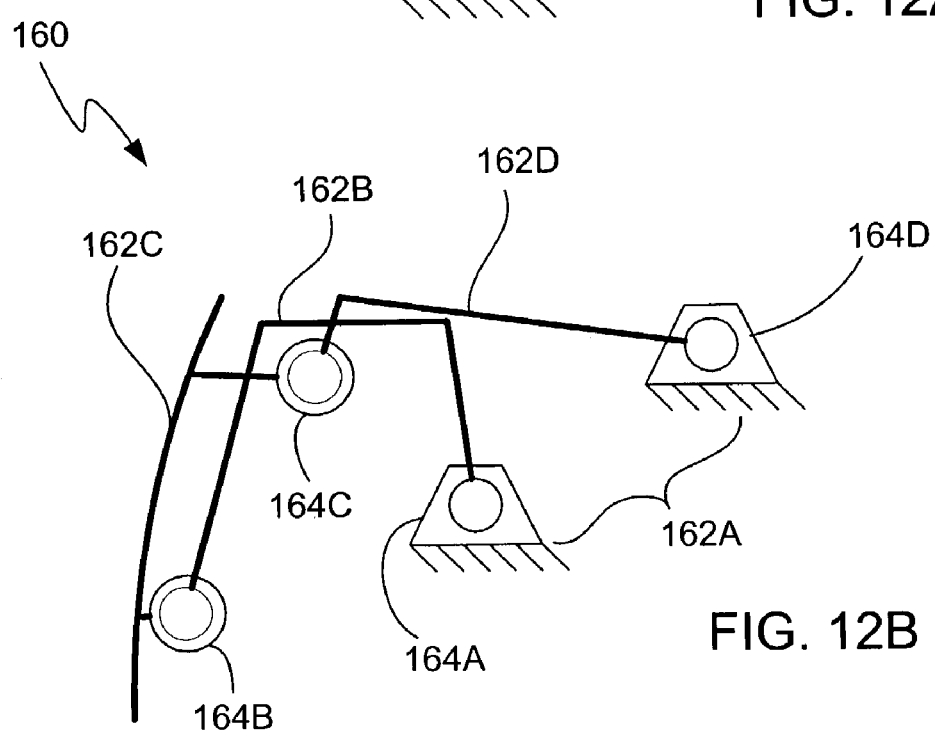

FIGS. 12A and 12B are simplified diagrams of a four bar linkage 160, in accordance with one embodiment of the present invention. By way of example, the four bar linkage 160 may correspond to the four bar linkage shown in FIGS. 11A–F. For ease of discussion, FIG. 12A shows the four bar linkage 160 in a first position such as the closed position shown in FIGS. 11D–11F and FIG. 12B shows the four bar linkage 160 in a second position such as the closed position shown in FIGS. 11A–11C. This particular linkage provides one DOF where only one input is needed to give a predictable results. The movement path may extend past the first and second positions, however, stops are generally provided to limit the motion to between the first and second positions. As shown in both figures, the four bar linkage 160 consists of four links 162A, 162B, 162C and 162D that are joined by four full joints 164A, 164B, 164C and 164D. Link 162A is a grounded link, while links 162B–D are movable links. For example, link 162B may be a rocker link, 162D may be a crank link and link 162C may be a coupler link. The grounded link 162A is defined by fixed joints 164A and 164D, and the coupler link 162C is defined by movable joints 164B and 164C. The coupler link 162C generally corresponds to the door while the grounded link 162A generally corresponds to the enclosure (e.g., joints 164A and 164B are fixed to the enclosure).

In order to move the linkage between positions, a force is generally applied to the crank link 162D. The force causes the crank link 162D to rotate about the fixed joint 164D, which in turn causes the rocker link 162B to rotate about the fixed joint 164A. All of this rotation allows the coupler link 162C to follow a prescribed path, as for example a path between the first and second positions.

Although not shown, a spring element may be used within the linkage 160 to provide a fifth variable length "force link" that supports and stabilizes the linkage 160. As long as the force link can provide the right amount of force, it can hold the system in static equilibrium. As should be appreciated, the linkage can be forced back into a one DOF system by overcoming the spring force. By way of example, the spring element may bias the linkage in the first position. In this particular case, a force may be applied to the crank link 162D to overcome the spring force and move the linkage to the second position, i.e., the force causes the crank link 162D to rotate about joint 164B.

Figure 13B:
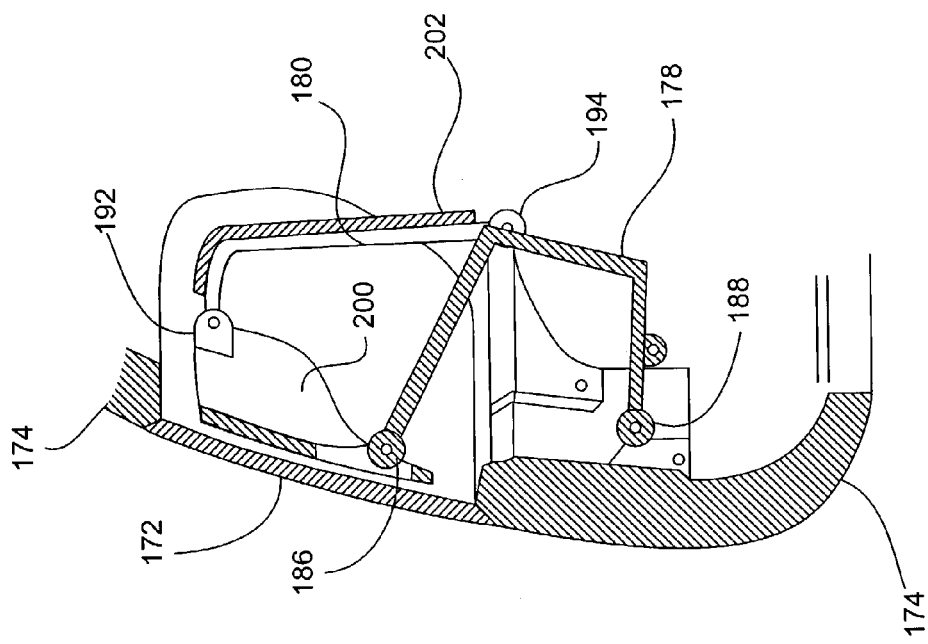
FIGS. 13A and 13B are broken away side views, in cross section, of a four bar linkage coupling a door to an enclosure, in accordance with one embodiment of the present invention.
Figure 13A:
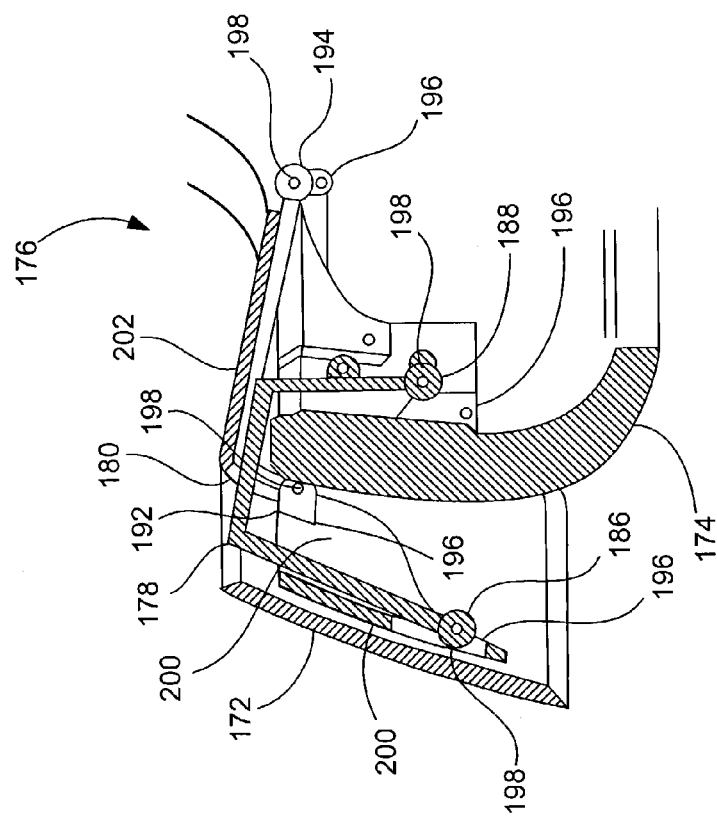
Figure 13E:
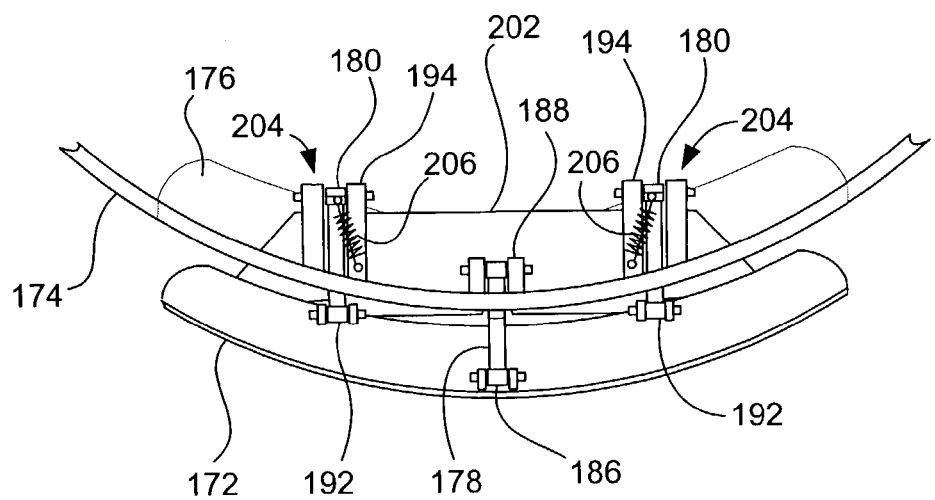
FIGS. 13E and 13F are broken away bottom views views, in cross section, of a four bar linkage coupling a door to an enclosure, in accordance with one embodiment of the present invention.
Figure 13F:
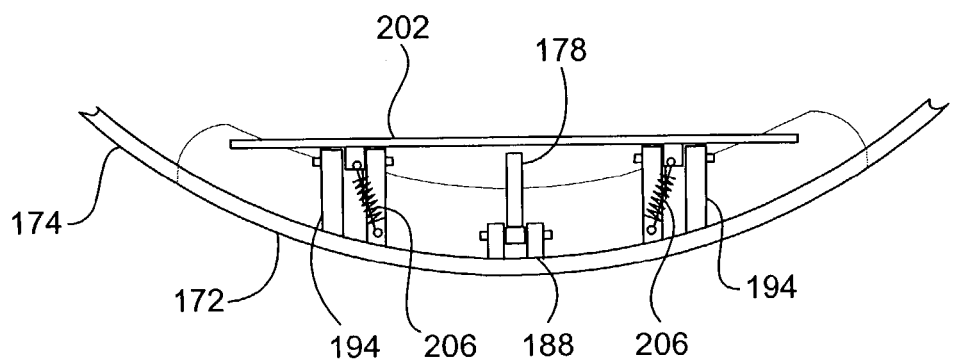

FIGS. 13A–13F are diagrams of a four bar linkage 170 coupling a door 172 to an enclosure 174, in accordance with one embodiment of the present invention. The four bar linkage 170 is configured to provide a sliding motion to the door 172 so that it can be moved between an open and closed position. That is, the linkage 170 allows the door 172 to slide between a closed position, placing the door 172 in front of an opening 176 of the enclosure 174, and an open position, placing the door 172 away from the opening 176 so as to provide access therethrough. The door 172 generally faces the same direction through the opening and closing motion such that the door remains substantially parallel to the enclosure during its motion. By way of example, the four bar linkage 170 may generally correspond to the four bar linkage shown in FIGS. 11A–F and 12A and 12B. FIGS. 13A and 13B are side elevation views, in cross section, of the four bar linkage 170. FIGS. 13C and 13D are back views (as seen from within the enclosure) of the four bar linkage 170. FIGS. 13E and 13F are bottom views of the four bar linkage 170. For ease of discussion, FIGS. 13A, 13C and 13E show the door in the open position, and FIGS. 13B, 13D, and 13F show the door in the closed position.

Referring to FIGS. 13A and B, the four bar linkage 170 generally includes an inner bar 178 and a pair of outer bars 180. The inner and outer bars 178 and 180 work together to movably couple the door 172 to the enclosure 174. The inner bar 178 is pivotally coupled to the door 172 through a movable joint 186 and pivotally coupled to the enclosure 174 through a fixed joint 188. In a similar manner, each of the outer bars 180 is pivotally coupled to the door 172 through movable joints 192 and pivotally coupled to the enclosure 174 through fixed joints 194. With regards to four bar linkages, the inner bar 178 serves as a rocker, the outer bars 180 serve as the crank, the door 172 serves as the coupler and the enclosure 174 serves as the ground.

The joints 186–194 may be widely varied. In the illustrated embodiment, the joints 186–194 consist of pivot mounts 196 and pivot pins 198 that pivotally couple the bars 178 and 180 to their respective pivot mounts 196, i.e., the pivot pins 198 are inserted through holes in the pivot mounts 196 and holes located at each end of the bars 178 and 180. The pivot mounts 196 may be separate elements or they may be integrally formed with the door and/or the enclosure. In the illustrated embodiment, the door pivot mounts 196 are integrally formed into a pivot support structure 200 that is attached to the door 172, and the enclosure pivot mounts 196 are integrally formed with the enclosure 174. The manner in which the pivot support structure 200 attaches to the door may be widely varied. For example, any suitable attachment means may be used (e.g., screws, bolts, adhesives, snaps, etc.).

The linkage 170 is configured to provide a swing path that leaves the door 172 as well as the bars 178 and 180 in a position that does not block the opening 176 when the door is in the opened position. The linkage 170 is also configured to provide a swing path that leaves the bars 178 inside the enclosure 174 so that they are hidden from view when the door 172 is in the closed position. In the illustrated embodiment, the inner bar 178 is U-shaped such that when the door 172 is in the open position the inner bar 178 drapes around the enclosure 174 and when the door 172 is in the closed position the inner bar 178 is hidden behind the door 172 and the enclosure 174. Furthermore, the outer bars 180 are L-shaped such that when the door 172 is in the open position the outer bars 180 drape around the enclosure 174 (top edge of the opening) and when the door 172 is in the closed position the bars 180 are hidden behind the door 172 and the enclosure 174.

Referring to FIGS. 13C–F, the four bar linkage 170 will be described in greater detail. As shown, the inner bar 178 is positioned at the center of the door 172, and the outer bars 180A and 180B are positioned at outer portions of the door 172, i.e., outer bar 180A is positioned on one side of the inner bar 178 and outer bar 180B is positioned on the other side of the inner bar 178. In most cases, the outer bars 180A and 180B are evenly spaced from the inner bar 178. The outer bars 180A and 180B are generally spaced to provide stability and support to the door 172 in both the open and closed position as well as when the door 172 moves between the two positions. Furthermore, the position of the inner bar 178 is offset O and O' from the position of the outer bars 180A and 180B. In particular, the outer door joints 192 are positioned at an upper portion of the door 172, and the outer enclosure joints 194 are positioned proximate the lower edge of the opening 176 while the inner door joint 186 is positioned at a lower portion of the door 172 and the inner enclosure joint 188 is positioned substantially below the lower edge of the opening 176 (positioned below the position of the outer enclosure joint 194).

As shown in FIGS. 13E and 13F, the linkage 170 may include a spring element 204 for biasing the bezel door 172 in either the opened or closed position. In the illustrated embodiment, the spring element 204 includes a pair tension springs 206 for biasing the door 172 in the closed position (FIG. 13F). Each of the springs 206 is generally disposed between the outer bars 180 and a portion of the enclosure 174 so as to provide a spring force therebetween. More particularly, each of the springs 206 is attached to the outer bars 180A and 180B and a portion of the enclosure 174. For example, the outer bars 180 may include holes for receiving a first end of the spring 206 and the pivot mount 196 may include a hole for receiving a second end of the spring 206. Although tension springs are shown, it should be noted that the spring element may vary according to the specific needs of each device (e.g., compression springs, torsion springs and the like). Additionally or alternatively, a spring may be provided between the inner bar 178 and the enclosure 174 to alternately or further bias the door in the closed position.

As shown in FIGS. 13A–F, the linkage 170 may also include a guard plate 202 for covering the bars 178 and 180 when the door 172 is in the open position. The guard plate may also serve as contact pad for a CD/DVD drive. In this particular configuration, a movable tray of a CD/DVD drive disposed inside the enclosure 174 would push against the inside of the guard plate 202 in order to open the door 172, i.e., work against the biasing force of the spring.

Although not shown, the four bar linkage described in FIGS. 11–13 may be configured with a gimbal mechanism to produce a tight fit with minimal cosmetic reveal between the mating surfaces of the door and the opening. By way of example, the gimbal mechanism described in FIG. 10 may be integrated with the four bar linkage shown in FIGS. 11–13. In this particular example, the support structure 200 may be configured like the support member 124 of the pivot hinge 104, i.e., it may include through holes for connecting shoulder bolts to the bezel door, and bosses for receiving the compression springs.

While this invention has been described in terms of several preferred embodiments, there are alterations, permutations, and equivalents, which fall within the scope of this invention. For example, although the enclosure has been described in terms of a general purpose computer, it should be noted that the enclosure may correspond to other types of computing devices, as for example, an external CD/DVD drive. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer, comprising:
   a housing having an opening and a curvilinear shape:
   a door movably coupled to the housing via a linkage mechanism, the door having a curvilinear shape that coincides with the curvilinear shape of the housing, the linkage mechanism allowing the door to move between a closed position where the door is placed against the housing and in front of the opening to prevent access therethrough, and an opened position where the door is placed away from the opening to allow access therethrough; and
   a gimbal mechanism that allows the door to move relative to the linkage mechanism while constraining the door to the linkage mechanism, the gimbal mechanism providing a tight fit between the door and the housing when the door is in the closed position.

2. The computer as recited in claim 1 wherein the housing is configured to enclose various internal components associated with the operation of the computer.

3. The computer as recited in claim 2 wherein the door is a CD or DVD drive door and wherein one of the internal components is a CD or DVD drive.

4. The computer as recited in claim 1 wherein the housing has a spherical shape, and wherein the door has a spherical shape that coincides with the spherical shape of the housing.

5. The computer as recited in claim 1 wherein the linkage mechanism is disposed inside the housing when the door is in the closed position so that the linkage mechanism is hidden from view when the door is in the closed position.

6. The computer as recited in claim 1 wherein the mating surfaces of the door and housing are configured to place the outer peripheral surfaces in their desired flush position.

7. The computer as recited in claim 1 wherein the linkage mechanism is a pivot hinge.

8. The computer as recited in claim 1 wherein the linkage mechanism is a four bar linkage.

9. The computer as recited in claim 1 wherein the gimbal mechanism allows the door to move in multiple degrees of freedom relative to the linkage mechanism.

10. The compute as recited in claim 1 wherein the gimbal mechanism allows the door to move in six degrees of freedom.

11. The computer as recited in claim 1 wherein the gimbal of the gimbal mechanism is implemented through one or more rotations, pivots translations, flexes.

12. The computer as recited in claim 1 wherein the outer peripheral surface of the door is substantially flush with the outer peripheral surface of the housing when the door is in the closed position so that the computer has an overall look that is uniform when the door is closed.

13. The computer as recited in claim 1 wherein the linkage mechanism includes a support member having a curvilinear shape that substantially coincides with the curvilinear shape of the door, the door being spaced away and movably constrained to the support member.

14. The computer as recited in claim 13 wherein the door is movably constrained to the support member via at least one shoulder bolt that protrudes out of the back of the door, each shoulder bolt passing through a hole in the support member thereby linking the door to the support member.

15. The computer as recited in claim 14 wherein the hole is sized to allow six degrees of freedom in limited amounts between the door and the support member.

16. The computer as recited in claim 14 wherein the shoulder bolt traps at least one compression spring in the space between the door and the support member, the at least one compression spring exerting a spring bias between the door and the support member.

17. The computer as recited in claim 14 wherein the door is movably constrained to the support member via a pair shoulder bolts that are spaced apart at opposing sides of the door, each of the shoulder bolts passing through a hole in the support member thereby linking the door to the support member at two points, and wherein the shoulder bolts traps a pair of compression spring in the space between the door and the support member, the compression springs being spaced apart at opposing sides of the door, the compression springs exerting a spring bias between the door and the support member.

18. The computer as recited in claim 1 wherein the door includes a support bar that structurally supports the door so that the door is able to maintain its curvilinear shape.

19. A computer door mechanism with a gimbal feature, comprising:
   a pivot hinge including a support member that is pivotally coupled to a pivot mount;
   a door panel including protrusions that are movably constrained to the support member, the protrusions moving relative to the support member in order to allow the door to move with multiple degrees of freedom relative to the support member, wherein the protrusions are shoulder bolts that are fixed to the door panel, and wherein the shoulder bolts are constrained within an opening in the support member.

20. The mechanism as recited in claim 19 wherein the door moves with 6 degrees of freedom relative to the support member.

21. The mechanism as recited in claim 19 wherein the door has a curvilinear shape that coincides with a curvilinear shape of a housing, and wherein the support member has a curvilinear shape that coincides with the curvilinear shape of the door.

22. The mechanism as recited in claim 19 wherein there is a space provided between the door and the support member, the space allowing the door to move relative to the support member.

23. The mechanism as recited in claim 22 further including a spring element disposed within the space between the door and the support member, the spring element holding the door in a desired position relative to the pivot hinge while allowing the door to move in multiple directions when an external force is applied thereto.

24. The mechanism as recited in claim 22 wherein a par of shoulder bolts are located at opposing sides of the door and a pair of openings are located at opposing sides of the support member, a fit shoulder bolt being constrained within a first opening, a second shoulder bolt being constrained within a second opening and further comprising a pair of compression springs disposed within the space between the door and the support member, the compression springs being spaced apart on opposing sides of the door and symmetrically from the center of the door.

25. The mechanism as recited in claim 24 wherein the diameter of the openings are larger than the diameter of the shoulder bolts thereby allowing the shoulder bolts to move about the openings, the interface between the shoulder bolts and the opening allowing the door limited movement in the x, y and z directions and about the x, y and z axes.

* * * * *

UNITED STATES PATENT AND TRADEMARK OFFICE
CERTIFICATE OF CORRECTION

PATENT NO.         : 7,055,160 B1                                               Page 1 of 1
APPLICATION NO. : 10/327717
DATED              : May 30, 2006
INVENTOR(S)        : Tan et al.

It is certified that error appears in the above-identified patent and that said Letters Patent is hereby corrected as shown below:

(column 16, line 1) change "compute" to --computer--.

(column 16, line 44) change "gimbal" to --gimballing --.

(column 17, line 7) change "par" to --pair--.

(column 17, line 10) change "a fit" to --a first--.

Signed and Sealed this

Fourteenth Day of November, 2006

JON W. DUDAS
*Director of the United States Patent and Trademark Office*